(12) United States Patent
Satoh et al.

(10) Patent No.: US 7,289,627 B2
(45) Date of Patent: Oct. 30, 2007

(54) HINGE, AND OPENING/CLOSING TYPE PORTABLE TERMINAL DEVICE HAVING THE SAME

(75) Inventors: Noriyoshi Satoh, Yokohama (JP); Fujio Arai, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 321 days.

(21) Appl. No.: 10/507,877

(22) PCT Filed: Feb. 27, 2003

(86) PCT No.: PCT/JP03/02245

§ 371 (c)(1),
(2), (4) Date: Sep. 15, 2004

(87) PCT Pub. No.: WO03/078854

PCT Pub. Date: Sep. 25, 2003

(65) Prior Publication Data

US 2005/0177978 A1 Aug. 18, 2005

(30) Foreign Application Priority Data

Mar. 19, 2002 (JP) ............................. 2002-076573

(51) Int. Cl.
*H04R 1/00* (2006.01)
*H04R 9/00* (2006.01)

(52) U.S. Cl. .................... 379/433.13; 379/433.01; 455/575.3; 455/550.1; 16/367

(58) Field of Classification Search ........... 379/433.13, 379/433.11, 433.01, 433.05, 433.12, 433.07, 379/434; 455/90.3, 556.1, 575.3, 550.1; 16/366–368, 330, 342, 303, 339–340, 351, 16/337; 361/679–683
See application file for complete search history.

(56) References Cited

U.S. PATENT DOCUMENTS 5,109,571 A * 5/1992 Ohshima et al. ............... 16/307

(Continued)

FOREIGN PATENT DOCUMENTS

EP 0 777 369 A2 6/1997

(Continued)

*Primary Examiner*—Melur Ramakrishnaiah
*Assistant Examiner*—Phylesha L Dabney
(74) *Attorney, Agent, or Firm*—Pearne & Gordon LLP

(57) ABSTRACT

In an opening/closing type portable terminal device having first and second box members that can be opened and closed and turned through a hinge, an object of the invention is to miniaturize the hinge and the device. A second turnable shaft (123) crosses a first turnable shaft (122) to turn together and is turnable with respect to the first turnable shaft (122). First and second guide members (126, 127) for controlling the turning angle of the second turnable shaft (123) are installed within the first turnable shaft (122). At a position across the first and second box members (101*a*, 101*b*), a flexible substrate (140) is interposed between the first turnable shat (122) and a first turnable shaft bearing (133) and is formed at one end thereof with a first winding (154*a*) to be wound on the outer periphery of the first turnable shaft bearing (133) and is turned together with the first turnable shaft (122).

5 Claims, 18 Drawing Sheets

U.S. PATENT DOCUMENTS

| | | |
|---|---|---|
| 6,886,221 B2 * | 5/2005 | Minami et al. ............... 16/324 |
| 6,985,580 B2 * | 1/2006 | Lu et al. ................ 379/433.13 |
| 7,007,345 B2 * | 3/2006 | Nakase et al. ............... 16/330 |
| 7,036,186 B2 * | 5/2006 | Jeong et al. .................. 16/303 |
| 7,096,540 B2 * | 8/2006 | Watanabe et al. ............ 16/367 |
| 7,100,244 B2 * | 9/2006 | Qin et al. .................... 16/330 |
| 7,136,687 B2 * | 11/2006 | Chang .................... 455/575.3 |
| 7,158,083 B2 * | 1/2007 | Satoh et al. ................ 343/702 |
| 2001/0004269 A1 | 6/2001 | Shibata et al. |
| 2005/0066474 A1 * | 3/2005 | Hsu et al. .................... 16/330 |
| 2005/0119023 A1 * | 6/2005 | Sudo et al. .............. 455/550.1 |
| 2005/0136970 A1 * | 6/2005 | Kim ....................... 455/550.1 |
| 2005/0160558 A1 * | 7/2005 | Kim ............................ 16/367 |
| 2005/0176478 A1 * | 8/2005 | Terada .................... 455/575.3 |

FOREIGN PATENT DOCUMENTS

| | | |
|---|---|---|
| JP | 11-030226 A | 2/1999 |
| JP | 11-041328 A | 2/1999 |
| JP | 2000-240636 A | 9/2000 |
| JP | 2001-041227 A | 2/2001 |
| JP | 2001-144837 A | 5/2001 |
| JP | 2001-251406 | 9/2001 |
| JP | 2001-320463 A | 11/2001 |
| JP | 2002-171189 A | 6/2002 |
| JP | 2002-310134 A | 10/2002 |
| JP | 2003-120652 A | 4/2003 |

* cited by examiner

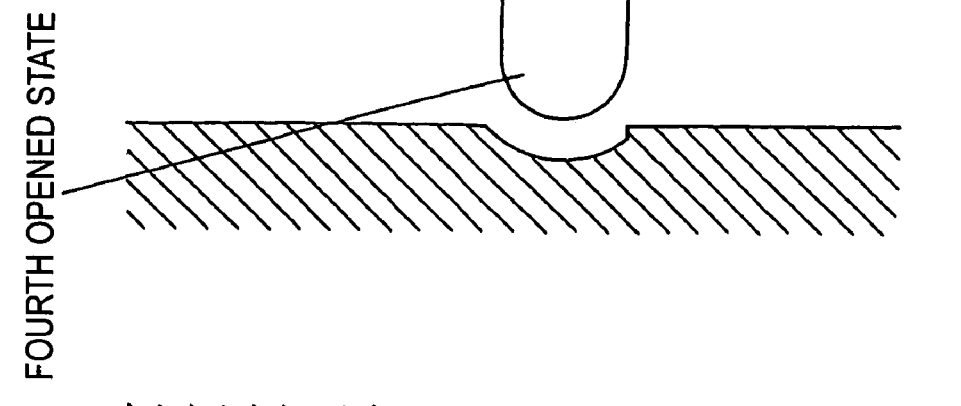
FIG. 18 (C) FOURTH OPENED STATE
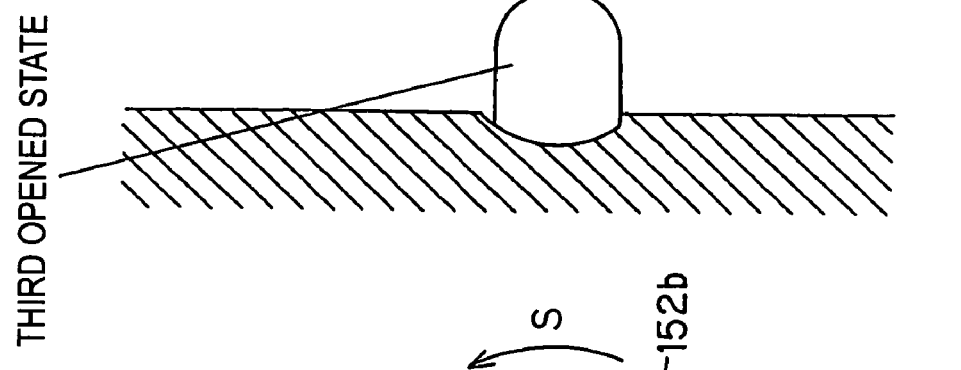
FIG. 18 (B) THIRD OPENED STATE
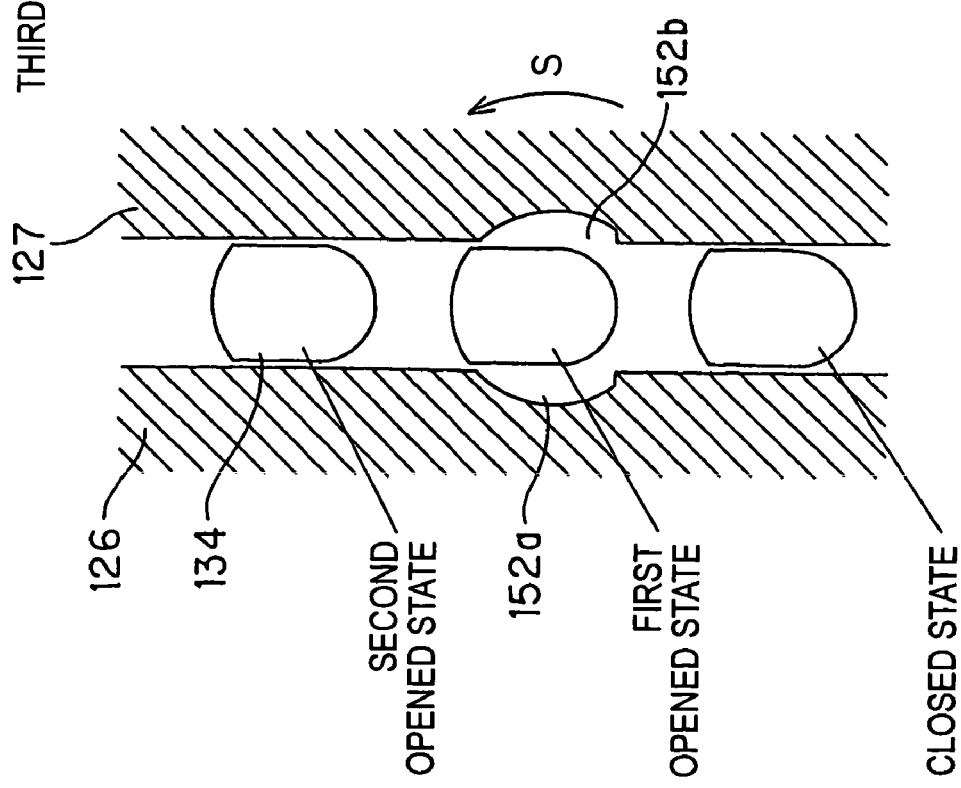
FIG. 18 (A)

PRIOR ART
FIG. 22 (A)
PRIOR ART
FIG. 22 (B)
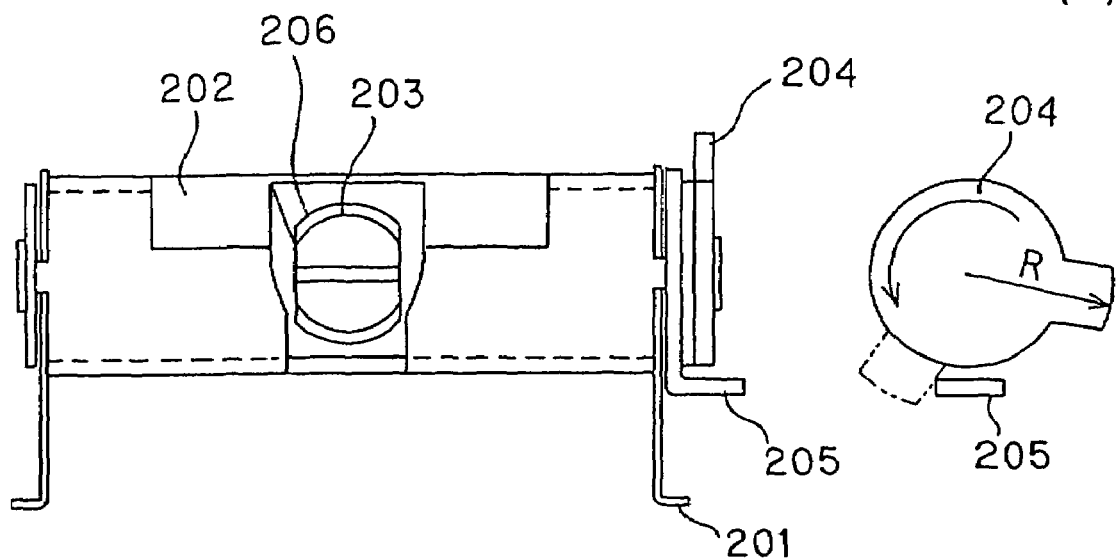
PRIOR ART
FIG. 23 (A)
PRIOR ART
FIG. 23 (B)
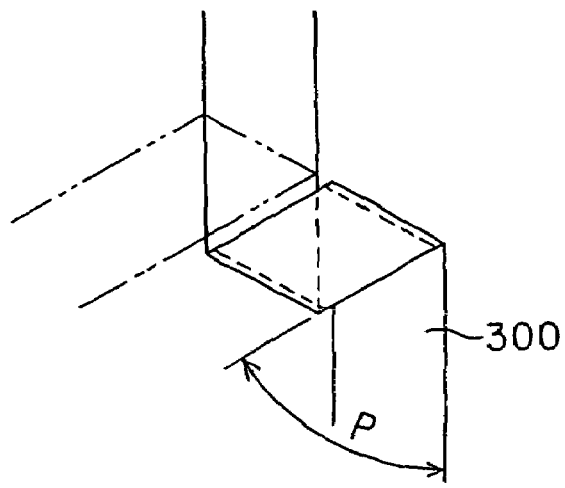
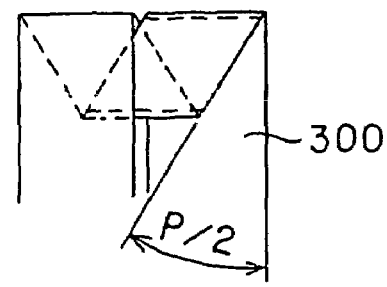

HINGE, AND OPENING/CLOSING TYPE PORTABLE TERMINAL DEVICE HAVING THE SAME

TECHNICAL FIELD

The present invention relates to a hinge and a configuration of a hinge portion in an opening/closing mobile information terminal device.

BACKGROUND ART

The folding mobile information terminal device in which two housings are coupled together by hinge portions and are constructed foldably is widely used. As the conventional device in which one housing is constructed to further turn in other directions in this folding mobile information terminal device, there is the device disclosed in JP-A-2001-251406, for example. The mobile information terminal device includes an inputting portion for inputting information, a displaying portion for monitoring an operation state and displaying received data, a controlling portion for controlling the inputting portion and the displaying portion, and a housing, wherein the inputting portion has a first inputting portion with numeric keys and a second inputting portion with function keys, the housing is divided in a first housing containing the second inputting portion and a second containing the displaying portion and the second inputting portion and both first and second housings are coupled together by hinge portions, and the first housing and the second housing are foldably and turnably coupled together by the hinge portions.

As the hinge mechanism for realizing such hinge portions, there is the mechanism disclosed in JP-A-2000-240636 and shown in FIGS. 22(A) and (B), for example. FIGS. 22(A) and (B) are a plan view and a side view of the hinge mechanism in the prior art. As shown in FIG. 22(A), the hinge portion is constructed to include an opening/closing shaft 202 supported turnably to an opening/closing shaft supporting portion 201, a turning shaft 203 rotatably passed through the opening/closing shaft 202 in their orthogonally intersecting state, an angle restricting piece 204 provided to come into contact with the opening/closing shaft supporting portion 201 and the opening/closing shaft 202 respectively, a restricting flange 205 provided to protrude from the turning shaft 203, and a turning restricting portion 206 fitted to the opening/closing shaft supporting portion 201 to face to the restricting flange 205. In the case where this hinge mechanism is applied to the above folding mobile information terminal device, as shown in FIG. 22(B), a size of the hinge portion formed by the turning shaft is decided by a distance R between a top end of the angle restricting piece 204, which is operated together with the turn of the turning shaft, and a center of the turning shaft.

Also, in JP-A-6-311216, the mobile phone in which a first housing composed of a first front housing and a first rear cover and a second housing composed of a second front housing and a second rear cover are turnably hinged together, a circular arc-like first curved-surface portion provided to an end portion of the first front housing and a circular arc-like second curved-surface portion provided to an end portion of the first rear cover are engaged with each other, an almost cylindrical first cavity portion that is communicated with an inside of the first housing is constructed at an end portion of the first housing and an almost cylindrical second cavity portion that is communicated with an inside of the second housing is constructed at an end portion of the second housing, the first cavity portion and the second cavity portion are arranged adjacently on the same shaft, and a flexible printed board for connecting an electric circuit in the first housing and an electric circuit in the second housing is wound helically along inner diameters of the first cavity portion and the second cavity portion to pass therethrough and also a cable provided to stretch over both housings is extended in a diameter of the helically-wound flexible printed board is disclosed.

However, when the conventional hinge mechanism is applied to the mobile phone having the above folding structure, an outer diameter of the hinge portion is enlarged to thus bring about an increase in size of the mobile phone. A size of the hinge portion is decided by a diameter of the opening/closing shaft and a radius of turn of the angle restricting piece provided to the end of the turning shaft. This radius of turn corresponds to the above distance R. Therefore, the configuration in which the angle restricting piece is provided to the end of the turning shaft brings out an increase of the radius of turn and as a result the hinge portion is increased in size. Also, since the mobile phone having the above folding structure has the structure that generates a bending stress and a torsional stress in the flexible printed board according to the folding operation, it is possible that conductor portions (circuit patterns) of the flexible printed board are disconnected. This problem will be explained concretely with reference to the drawing hereunder.

FIGS. 23(A) and (B) are a plan view of a flexible printed board through which a hinge portion in the prior art is passed. A flexible printed board 300 is wound and housed in the hinge portion to be connected to connectors that are provided to not-shown first and second housings respectively. In FIG. 23(A), in the case where the first and second housings are folded, one end of the board is indicated by a chain double-dashed line when the housings are folded until the state that a torsion angle P of the flexible printed board 300 that is wound clockwise from the lower side to the upper side is not changed.

However, since positions in which both ends of the flexible printed board 300 are fixed to the first and second housings (the lateral direction) are not changed, the torsion angle P is changed into an almost P/2 when the board is folded from the opened state. In other words, in this structure, the bending stress and the torsional stress are applied to the flexible printed board by the folding operation. Normally the flexible printed board has flexibility and has the enough strength to withstand the bending stress, but the disconnection or the breakage is caused if various stresses are applied compositely.

As a result, the mobile phone having the conventional folding structure is the structure that failures such as the disconnection or the breakage of the flexible printed board, etc. readily occur when the folding operation is repeated. Thus, there exists the problem such that the increase in size of the device is brought about or it is possible to cause the failures.

DISCLOSURE OF THE INVENTION

The present invention has been made in light of the above problems and first it is an object of the present invention to provide a hinge capable of reducing a radius of turn on a turning shaft and achieving a reduction in size, and an opening/closing mobile terminal device equipped with this hinge. Also, second it is another object of the present invention to provide a hinge capable of realizing a hinge portion in which no torsional stress is generated in a flexible printed board provided therein and achieving a reduction in size, and an opening/closing mobile terminal device equipped with this hinge.

A hinge according to the first configuration of the present invention comprises a first turning member that is able to turn; a second turning member intersected with the first turning member to turn together and provided turnably to the first turning member; and a turning restricting means for restricting a turning angle or a turning direction of the second turning member; wherein the turning restricting means is arranged in vicinity of a center axis of a turning shaft of the first turning member.

According to this configuration, increase in size of the hinge caused due to the turning restricting means can be avoided, and reduction in a radius of turn of the first turning member can be achieved.

In the hinge according to the second configuration of the present invention, in the first configuration, the turning restricting means is constructed by a cam member provided to turn together with the second turning member, and a guiding member provided adjacent to the cam member, and a contact portion that comes into contact with the cam member when the second turning member is turned in a state that the first turning member is in a first predetermined position, and a contact avoiding portion that avoids a contact with the cam member when the second turning member is turned in a state that the first turning member is in a second predetermined position are provided to the guiding member.

According to this configuration, since the cam member that is turned together with the second turning member can be brought into contact with the contact portion when the first turning member is in the first predetermined position, the turn of the second turning member can be suppressed. Also, since the cam member that is turned together with the second turning member does not come into contact with the contact portion when the first turning member is in a second predetermined position, the second turning member can be turned when the first turning member is in the second predetermined position.

In the hinge according to the third configuration of the present invention, in the second configuration, an opposing surface that opposes to the cam member in a direction that intersects orthogonally with a turning direction of the cam member is formed on the contact avoiding portion in a state that the cam member is passed through the contact avoiding portion by turning the second turning member when the first turning member is in the second predetermined position.

According to this configuration, the turn of the first turning member can be prevented in a state that the second turning member is turned.

A hinge according to the fourth configuration of the present invention, in any of the first to third configuration, further comprises a click generating means for generating a click when the first turning member is turned toward one end side of the first turning member.

According to this configuration, a click can be produced in the turning operation of the first turning member with a simple configuration while avoiding increase in size of the first turning member.

An opening/closing mobile terminal device having the hinge according to the fifth configuration of the present invention is constructed by providing the hinge set forth in any one of claims 1 to 4 to the opening/closing mobile terminal device.

According to this configuration, the mobile terminal device which is convenient in use and in which the hinge portion is reduced in size can be realized such that the size is made small by closing the housing upon carrying to improve the portability and the desired operation can be executed in use.

An opening/closing mobile terminal device having the hinge according to the sixth configuration of the present invention, in the fifth configuration, further comprises a first housing member for supporting turnably the first turning member; a second housing member onto which the second turning member is mounted; and a flexible conductor for connecting electrically the first housing member and the second housing member; wherein the flexible conductor is interposed on one end side of the first turning member in vicinity of a center axis of a turning shaft of the first turning member in a position that stretches over the first housing member and the second housing member.

According to this configuration, the stress generated in the flexible conductor in the position that stretches over the first housing member and the second housing member can be reduced or generation of such stress can be prevented even though the first housing member and the second housing member are opened and closed.

In the opening/closing mobile terminal device having the hinge according to the seventh configuration of the present invention, in the sixth configuration, the flexible conductor is formed of a strip-like flexible board, and the flexible board includes a first winding portion almost around a center axis of a turning shaft of the first turning member on one end side of the first turning member.

According to this configuration, the tension and the loose generated in the flexible board during the opening/closing can be absorbed by the first winding portion. That is, since only the curvature of the first winding portion of the flexible board is changed, merely the bending stress is generated in the flexible board and generation of the torsional stress can be prevented.

An opening/closing mobile terminal device having the hinge according to the eighth configuration of the present invention, in the seventh configuration, further comprises a cable-like second flexible conductor; wherein the second flexible conductor is passed through the first winding portion.

According to this configuration, since the cable-like second flexible conductor is arranged in an inner empty space of the first winding portion, the friction between the flexible board and the second flexible conductor can be avoided while avoiding the tension and the loose of the second flexible conductor. Also, since the cable with small loss is used as the connection parts to connect the antenna and the radio circuit portion, reduction in the antenna gain can be avoided.

In the opening/closing mobile terminal device having the hinge according to the ninth configuration of the present invention, in the seventh or eighth configuration, the flexible board includes a second winding portion almost around a center axis of a turning shaft of the second turning member.

According to this configuration, the tension and the loose of the flexible board generated during the turn of the second turning member can be absorbed by the second winding portion.

In the opening/closing mobile terminal device having the hinge according to the tenth configuration of the present invention, in the sixth configuration, the flexible conductor is formed of a cable.

According to this configuration, since the cable is arranged at a center axis of the turning shaft of the first turning member, the tension and the loose of the cable can be avoided.

Also, there is provided a opening/closing mobile terminal device having a hinge which comprises a hinge portion for coupling foldably the first housing member and the second housing member; and a flexible board and a cable for connecting electrically the first housing member and the second housing member; wherein a winding portion is formed by the flexible board on one side of the hinge portion with a center axis of the turning shaft of the hinge portion as an almost center, and the cable is passed through the winding portion.

According to this configuration, since the cable is arranged in an inner empty space of the winding portion, the friction between the flexible board and the cable can be avoided while avoiding the tension and the loose of the cable. Also, since the cable with small loss is used as the connection parts to connect the antenna and the radio circuit portion, reduction in the antenna gain can be avoided.

An opening/closing mobile terminal device having the hinge according to the eleventh configuration of the present invention, in any one of the sixth to tenth configurations, further comprises a camera portion provided on an opposing surface of other housing member opposing to one housing member when the first housing member and the second housing member are closed; a first display portion provided adjacent to the camera portion to display an image picked up by the camera portion; and a second display portion provided to an opposite surface on an opposite side to the opposing surface to display the image picked up by the camera portion; wherein the image picked up by the camera portion is displayed on the first display portion when the other housing member is directed in a first direction in a state that the first housing member and the second housing member are opened, and the image on the first display portion is erased and the image picked up by the camera portion is displayed on the second display portion when the other housing member is directed in a second direction on an opposite side to the first direction.

According to this configuration, when the device is directed in the first direction, the subject himself or herself to whom the camera is directed can look at the picked-up image displayed on the first display portion to monitor the image picked-up situation. Also, when the device is directed in the second direction (when the camera portion picks up the image of the subject in the foreground of the user), the first display portion directed to the subject side is brought into its non-display state to prevent the situation that the picked-up image is looked into by the subject or the third person, and also the user can monitor the image picked-up situation by looking at the picked-up image displayed on the second displaying portion directed to the user.

Also, there is provided a opening/closing mobile terminal device having a hinge which comprises a hinge portion for coupling the first housing member and the second housing member to open/close mutually such that the other housing member is coupled with one housing member turnably in a direction intersecting orthogonally with an opening/closing direction when the first housing member and the second housing member are opened; a camera portion provided on an opposing surface of other housing member opposing to one housing member when the first housing member and the second housing member are closed; a first display portion provided adjacent to the camera portion to display an image picked up by the camera portion; and a second display portion provided to an opposite surface on an opposite side to the opposing surface to display the image picked up by the camera portion; wherein the image picked up by the camera portion is displayed on the first display portion when the other housing member is directed in a first direction in a state that the first housing member and the second housing member are opened, and the image on the first display portion is erased and the image picked up by the camera portion is displayed on the second display portion when the other housing member is directed in a second direction on an opposite side to the first direction.

According to this configuration, when the device is directed in the first direction, the subject himself or herself to whom the camera is directed can look at the picked-up image displayed on the first display portion to monitor the image picked-up situation. Also, when the device is directed in the second direction (when the camera portion picks up the image of the subject in the foreground of the user), the first display portion directed to the subject side is brought into its non-display state to prevent the situation that the picked-up image is looked into by the subject or the third person, and also the user can monitor the image picked-up situation by looking at the picked-up image displayed on the second displaying portion directed to the user.

BRIEF DESCRIPTION OF THE DRAWINGS

FIGS. 18(A) to (C) are a cam chart showing a relationship between a cam and a guiding member of the hinge unit according to the first embodiment of the present invention;

FIGS. 22(A) and (B) are a plan view and a side view of a hinge mechanism in the related art; and FIGS. 23(A) and (B) are a plan view of a flexible printed board through which a hinge portion in the prior art is passed.

Figure 1:
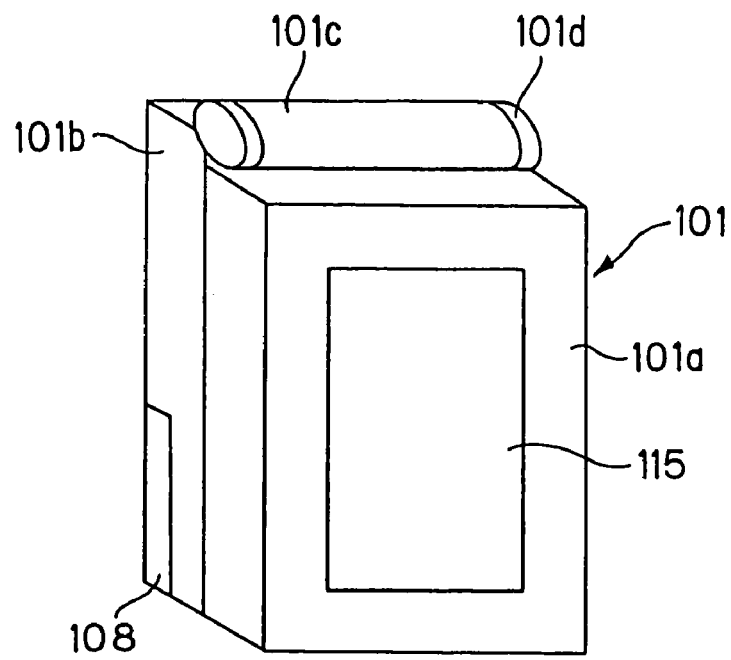
FIG. 1 is a perspective view showing a closed state of a mobile phone according to an embodiment of the present invention.

In above Figures, a reference numeral 101 is a housing, 101a first housing member, 101b second housing member, 101c and 101d hinge portion, 111 camera portion, 112 first Hall element, 113 second Hall element, 117 first permanent magnet, 118 second permanent magnet, 119 hinge unit, 122 first turning shaft, 123 second turning shaft, 124 first supporting plate, 125 second supporting plate, 126 first guiding member, 127 second guiding member, 128 first coil spring, 129 first sliding member, 131 first turning shaft cover, 133 first turning shaft bearing, 134 cam, 136 second coil spring, 137 second sliding member, 140 flexible board, 141 cable, 144 and 148 concave portion, 147 and 150 through hole, 152a and 152b groove, 154a first winding portion, and 154b second winding portion.

BEST MODE FOR CARRYING OUT THE INVENTION

Figure 2:
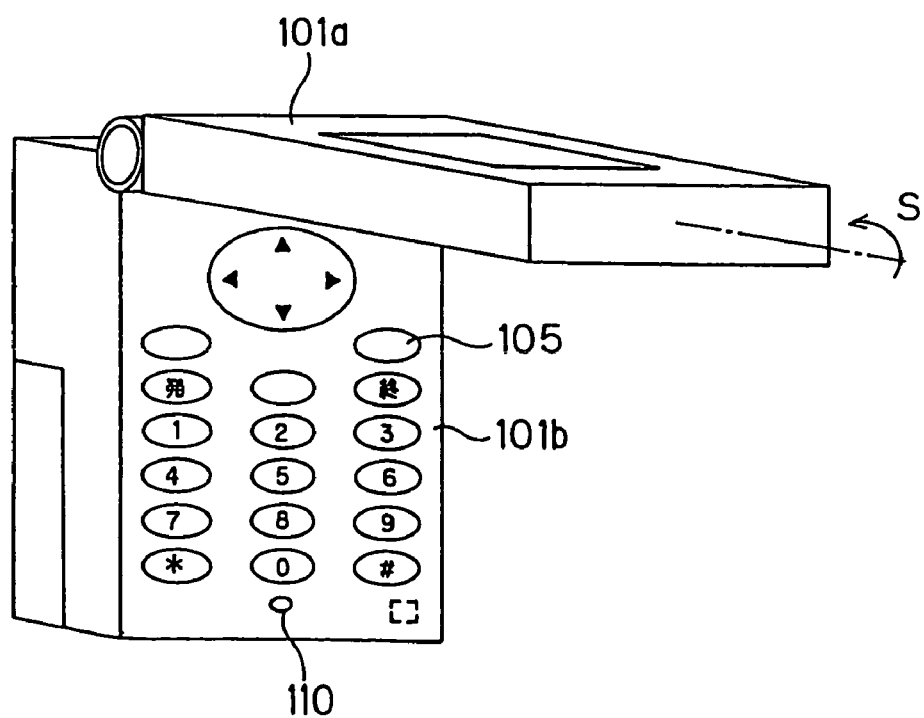
FIG. 2 is a perspective view showing a first opened state of the mobile phone according to the embodiment of the present invention.
Figure 3:
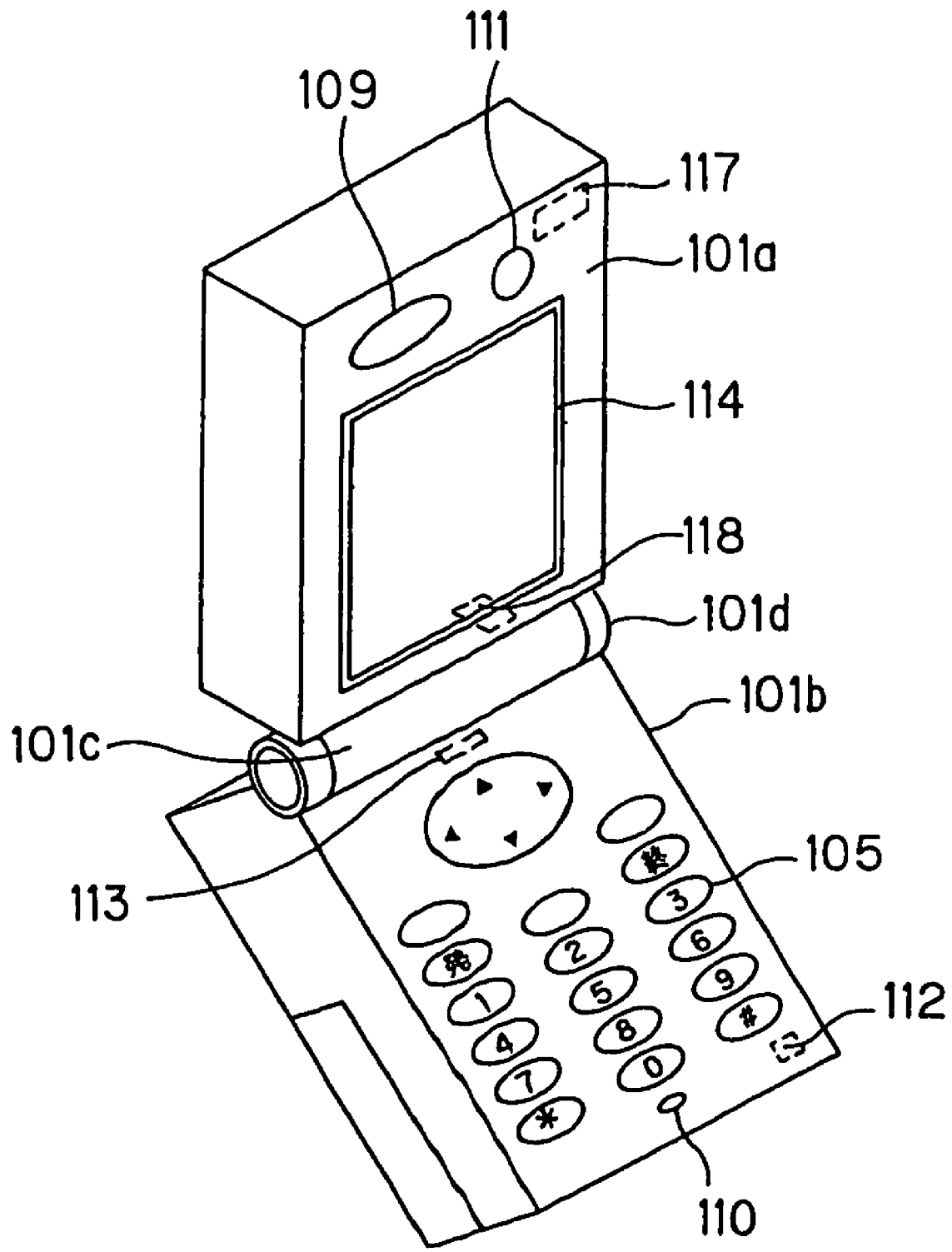
FIG. 3 is a perspective view showing a second opened state of the mobile phone according to the embodiment of the present invention.
Figure 4:
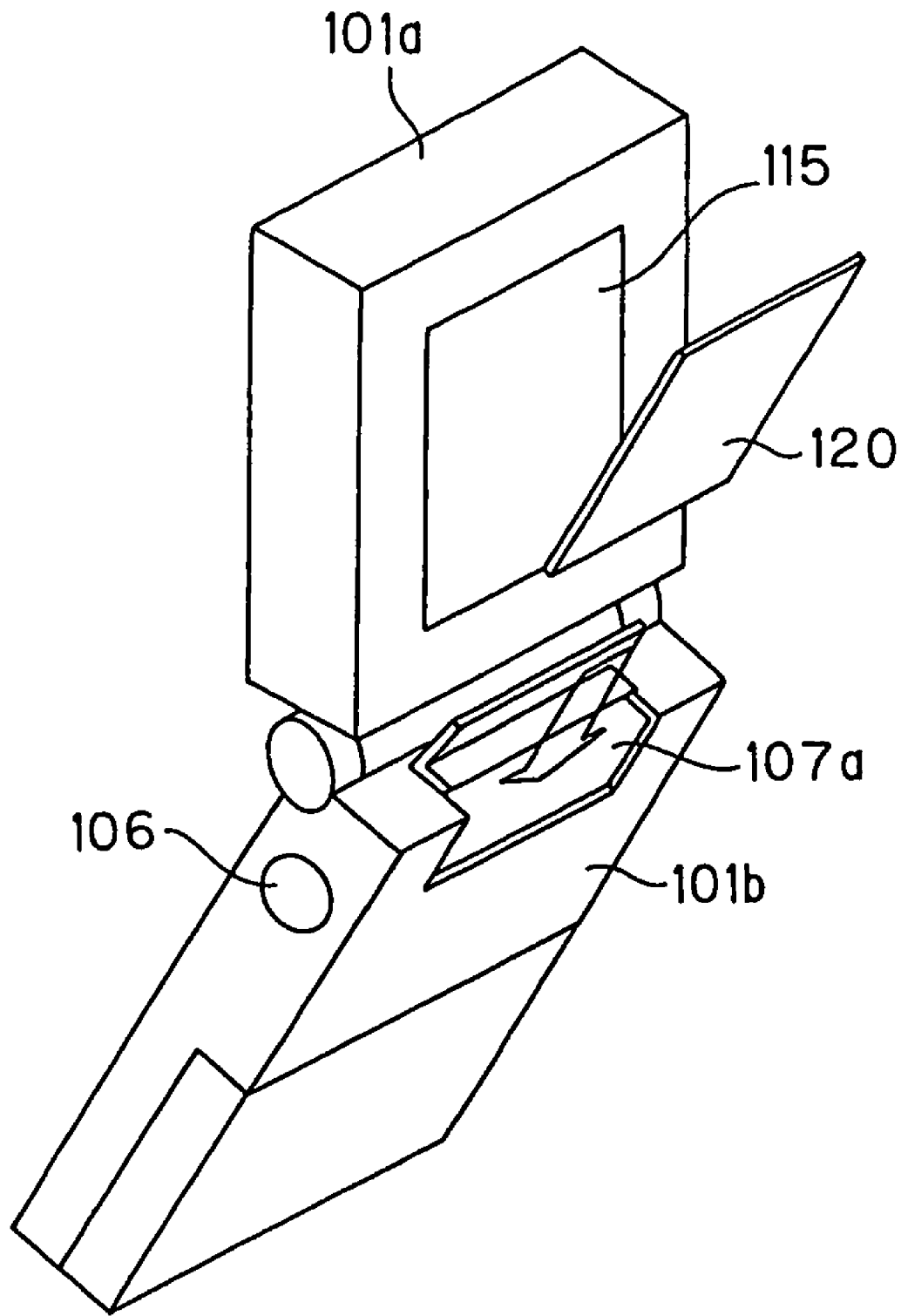
FIG. 4 is a perspective view showing the mobile phone in the state in FIG. 3, viewed from the rear surface side.
Figure 5:
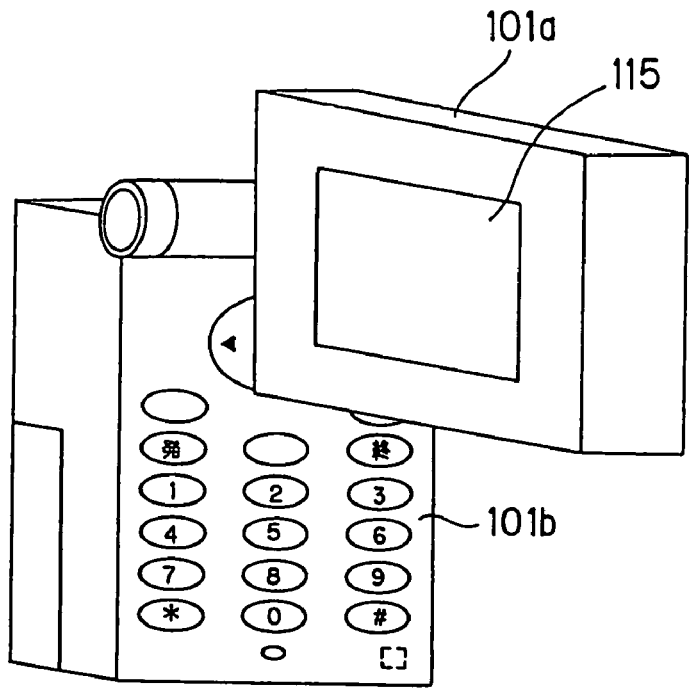
FIG. 5 is a perspective view showing a third opened state of the mobile phone according to the embodiment of the present invention.

Embodiments of the present invention will be explained with reference to the drawings hereinafter. Here, as an example of the opening/closing mobile terminal device, the opening/closing mobile phone as one type of the mobile terminals will be exemplified. FIG. 1 is a perspective view showing a closed state of a mobile phone according to an embodiment of the present invention. FIG. 2 is a perspective view showing a first opened state of the mobile phone according to the embodiment of the present invention. FIG. 3 is a perspective view showing a second opened state of the mobile phone according to the embodiment of the present invention. FIG. 4 is a perspective view showing the mobile phone in the state in FIG. 3, viewed from the rear surface side. FIG. 5 is a perspective view showing a third opened state of the mobile phone according to the embodiment of the present invention.

Figure 6:
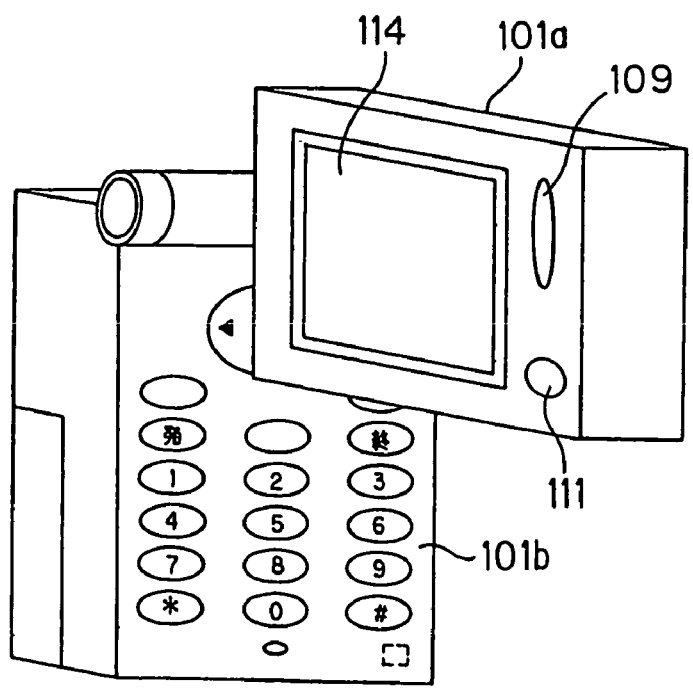
FIG. 6 is a perspective view showing a fourth opened state of the mobile phone according to the embodiment of the present invention.
Figure 7:
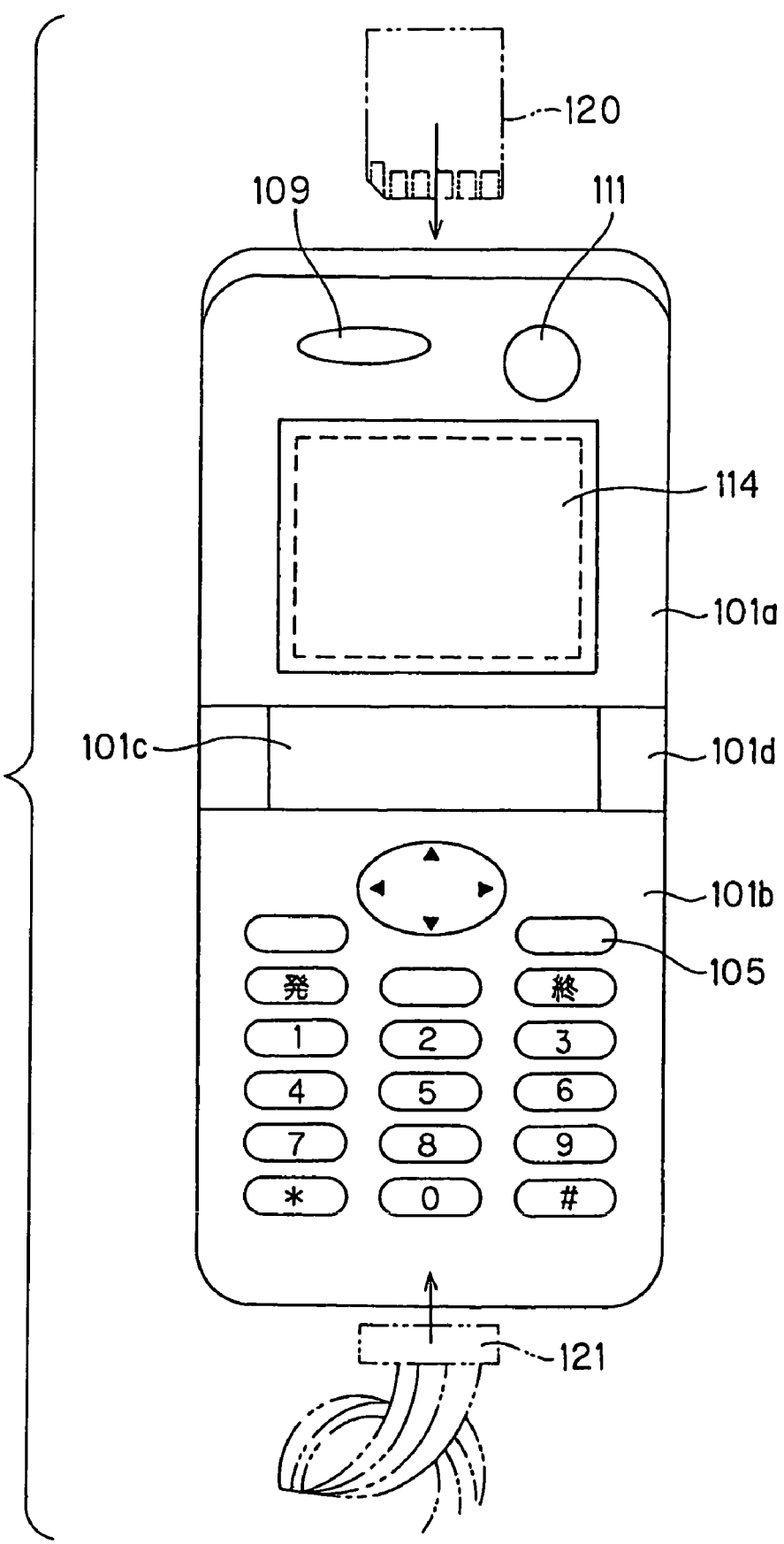
FIG. 7 is a plan view showing a front surface of the mobile phone according to the embodiment of the present invention.
Figure 8:
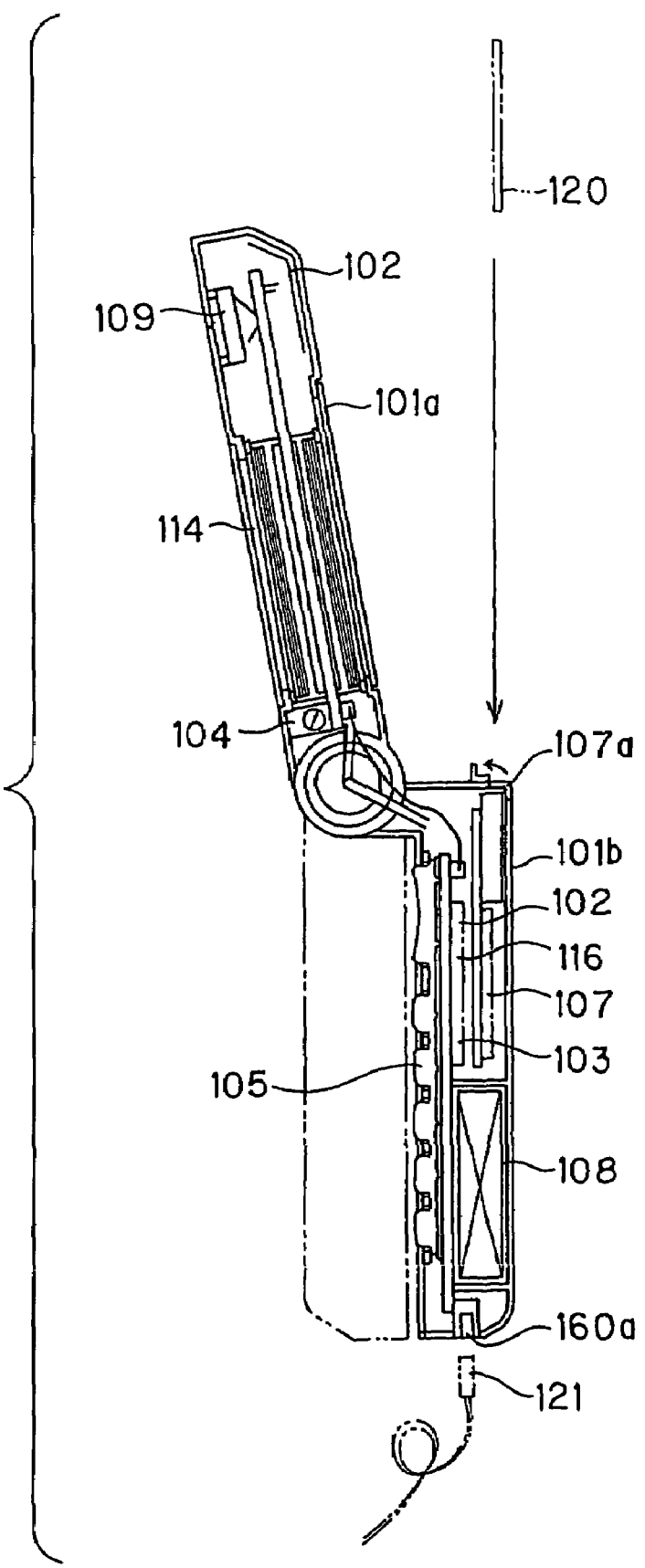
FIG. 8 is a sectional view showing a longitudinal sectional shape of the mobile phone in FIG. 7.
Figure 9:
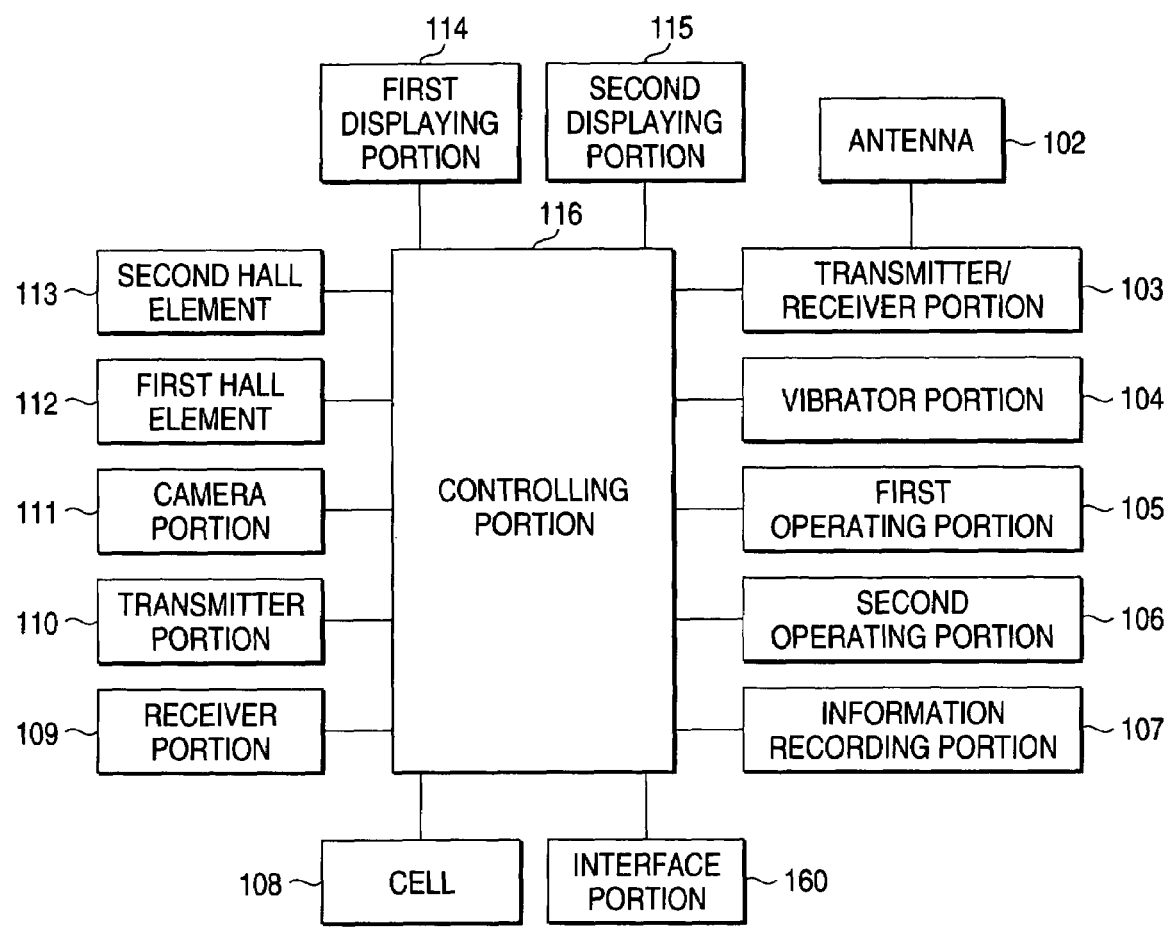
FIG. 9 is a block diagram showing a functional configuration of the mobile phone according to the embodiment of the present invention.

FIG. 6 is a perspective view showing a fourth opened state of the mobile phone according to the embodiment of the present invention. FIG. 7 is a plan view showing a front surface of the mobile phone according to the embodiment of the present invention. FIG. 8 is a sectional view showing a longitudinal sectional shape of the mobile phone in FIG. 7. FIG. 9 is a block diagram showing a functional configuration of the mobile phone according to the embodiment of the present invention.

As shown in FIG. 1 to FIG. 9, a mobile phone as one type of an opening/closing mobile terminal device according to the embodiment of the present invention is constructed to have a housing 101 in which a first housing member 101a and a second housing member 101b are coupled to each other via hinge portions 101c, 101d to open and close. This mobile phone includes an antenna 102, a transmitter/receiver portion 103, a vibrator portion 104, a first operating portion 105, a second operating portion 106, an information recording portion 107, a receiver portion (receiver) 109, a transmitter portion (microphone) 110, a camera portion 111, a first displaying portion 114, a second displaying portion 115, an interface portion 160, and a controlling portion 116, and also a cell 108 is put removably into a rear surface of the housing 101 as a power supply. Also, a card slot 107a is provided to the vicinity of a rear hinge portion of the housing 101 as the information recording portion 107, and an information recording card 120 is inserted into the card slot 107a to mount. In addition, a connector 160a is provided to a top end portion of the housing 101 as the interface portion 160, and an external connector 121 to which an external device is connected is fitted to the connector to execute the transmission/reception of the signal, etc. Also, a first Hall element 112, a second Hall element 113, a first permanent magnet 117, and a second permanent magnet 118 are provided to the inside of the housing 101.

As shown in FIG. 9, the transmitter/receiver portion 103 is connected to the antenna 102, and has a function of executing the transmission and the reception between this device and an external base station, or the like via the radio communication. The controlling portion 116 is connected to the transmitter/receiver portion 103, the vibrator portion 104, the first operating portion 105, the second operating portion 106, the information recording portion 107, the receiver portion 109, the transmitter portion 110, the camera portion 111, the first Hall element 112, the second Hall element 113, the first displaying portion 114, and the second displaying portion 115, and controls operations of respective portions, and so forth. Also, the controlling portion 116 is connected to the cell 108 and receives a power supply from the cell 108 to operate.

The antenna 102 receives the radio signal and sends out the received signal to the transmitter/receiver portion 103. The transmitter/receiver portion 103 processes the received signal from the antenna 102 to convert into a speech signal, and feeds the signal to the receiver portion 109. The receiver portion 109 outputs the speech that is received in response to the received signal of the speech signal fed from the transmitter/receiver portion 103. The transmitter portion 110 receives the speech of the speaker to convert into a transmitted signal of the speech signal, and sends out the signal to the transmitter/receiver portion 103. The transmitter/receiver portion 103 processes the transmitted signal sent from the transmitter portion 110 and sends out the signal to the antenna 102. The antenna 102 receives the transmitted signal from the transmitter/receiver portion 103 and transmits the signal as the radio signal.

The vibrator portion 104 oscillates in receiving, or the like to inform of an event of reception, or the like by vibration. The first operating portion 105 is constructed to have a plurality of operation buttons and switches used to input characters, symbols, figures, operation signals, and so on. The second operating portion 106 is constructed to have operation buttons and switches used to operate the camera portion 111. The information recording portion 107 can record phone number information, speech information, non-speech information, image information, etc. under control of the controlling portion 116.

The first and second displaying portions 114, 115 are constructed by a liquid crystal display device, and display characters, symbols, figures, images, etc. thereon. The first displaying portion 114 is provided to a first surface of the first housing member 101a (a main surface (called also a front surface) of the first housing member) exposed when the first housing member 101a and the second housing member 101b are opened. The second displaying portion 115 is provided to a second surface (a sub surface (called also a rear surface) of the first housing member) of the first housing member 101a on the opposite side to the first surface. The camera portion 111 is provided to the first surface of the first housing member 101a and is arranged to pick up the image in the foreground of the first displaying portion 114.

The housing 101 consists of two members of the first housing member 101a and the second housing member 101b. The first and second housing members 101a, 101b are coupled together via the hinge portion 101c, in which a hinge unit 119 described later is incorporated, and the hinge portion 101d, which is formed in the second housing member 101b to hold the hinge portion 101c. The first and second housing members 101a, 101b are coupled together to open/close and turn in a predetermined position in the direction perpendicular to the opening/closing direction by the operation of the hinge unit 119. In this case, in the first and second housing members 101a, 101b, an end portion on the hinge portion side is called a base end and an end portion on the opposite side is called a top end.

The mobile phone constructed in this manner is used in a state that the first housing member 101a is closed to oppose next to the second housing member 101b in carrying (shown in FIG. 1). In using (in speaking, or the like), the mobile phone is used in a state that the first housing member 101a is opened from the second housing member 101b by 90 degree or more (which is called a second opened state, and shown in FIG. 3 and FIG. 4). Also, the first housing member 101a is turned in the S direction perpendicular to the opening/closing direction (which is called a third opened state, and shown in FIG. 5) from a state that the first housing member 101a is opened from the second housing member 101b up to almost 90 degree (which is called a first opened state, and shown in FIG. 2), otherwise the first housing member 101a is turned in the direction opposite to the S direction (which is called a fourth opened state, and shown in FIG. 6) from the first opened state, and the mobile phone can also be used in these states.

The first permanent magnet 117 is provided in the inside near the main surface in the top end portion of the first housing member 101a. Also, the first Hall element 112 is provided in the inside near the surface (the main surface of the second housing member) in the top end portion of the second housing member 101b, which opposes to the main surface of the first housing member 101a when the first housing member 101a and the second housing member 101b are closed. In addition, the second Hall element 113 is provided in the inside near the main surface in the almost middle of the base end portion of the second housing member 101b. Also, the second permanent magnet 118 is provided in the inside near the surface (the end surface on the base end side) in the base end portion of the first housing member 101b, which faces to the main surface of the second housing member 101b in the fourth opened state.

Accordingly, since the first permanent magnet 117 comes close to the first Hall element 112 when the first housing member 101a and the second housing member 101b are closed, the first Hall element 112 senses a magnetic force from the first permanent magnet 117 to give a sensed signal to the controlling portion 116. Also, since the first permanent magnet 117 is away from the first Hall element 112 when the first housing member 101a and the second housing member 101b are in the opened states (shown in FIG. 2 to FIG. 6), the first Hall element 112 cannot sense the magnetic force from the first permanent magnet 117 and thus the sensed signal is not generated.

Also, since the second permanent magnet 118 is away from the second Hall element 113 when the first housing member 101a and the second housing member 101b are closed and in any position in the first, second, third opened states, the second Hall element 113 cannot sense the magnetic force from the second permanent magnet 118 and thus the sensed signal is not generated.

In contrast, since the second permanent magnet 118 comes close to the second Hall element 113 in the fourth opened state, the second Hall element 113 senses a magnetic force from the second permanent magnet 118 to give a sensed signal to the controlling portion 116.

The controlling portion 116 can recognize opened/closed states and turned states of the first housing member 101a and the second housing member 101b in answer to whether or not such controlling portion receives the sensed signal from the first, second Hall element 112, 113.

Figure 10:
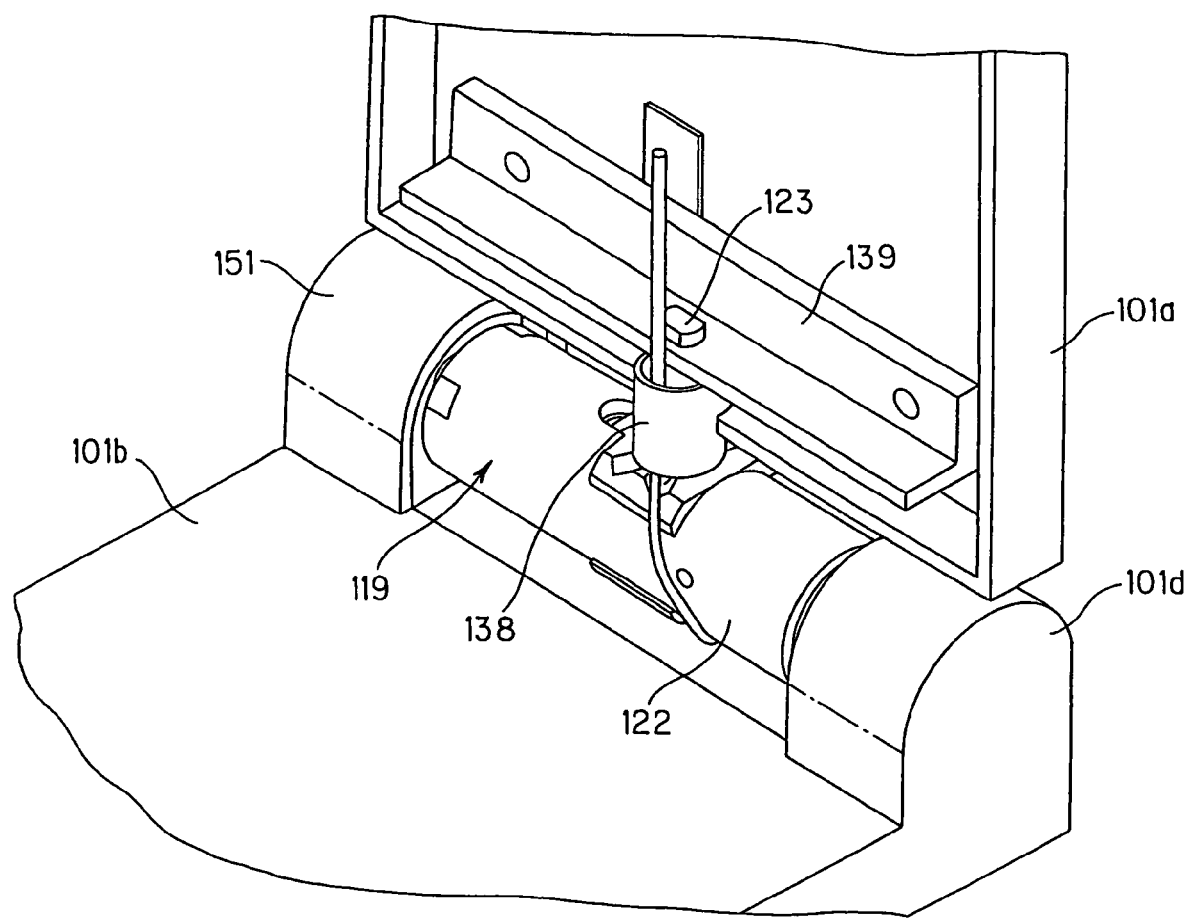
FIG. 10 is a partially enlarged perspective view of a hinge portion used in a mobile phone according to a first embodiment of the present invention.
Figure 11:
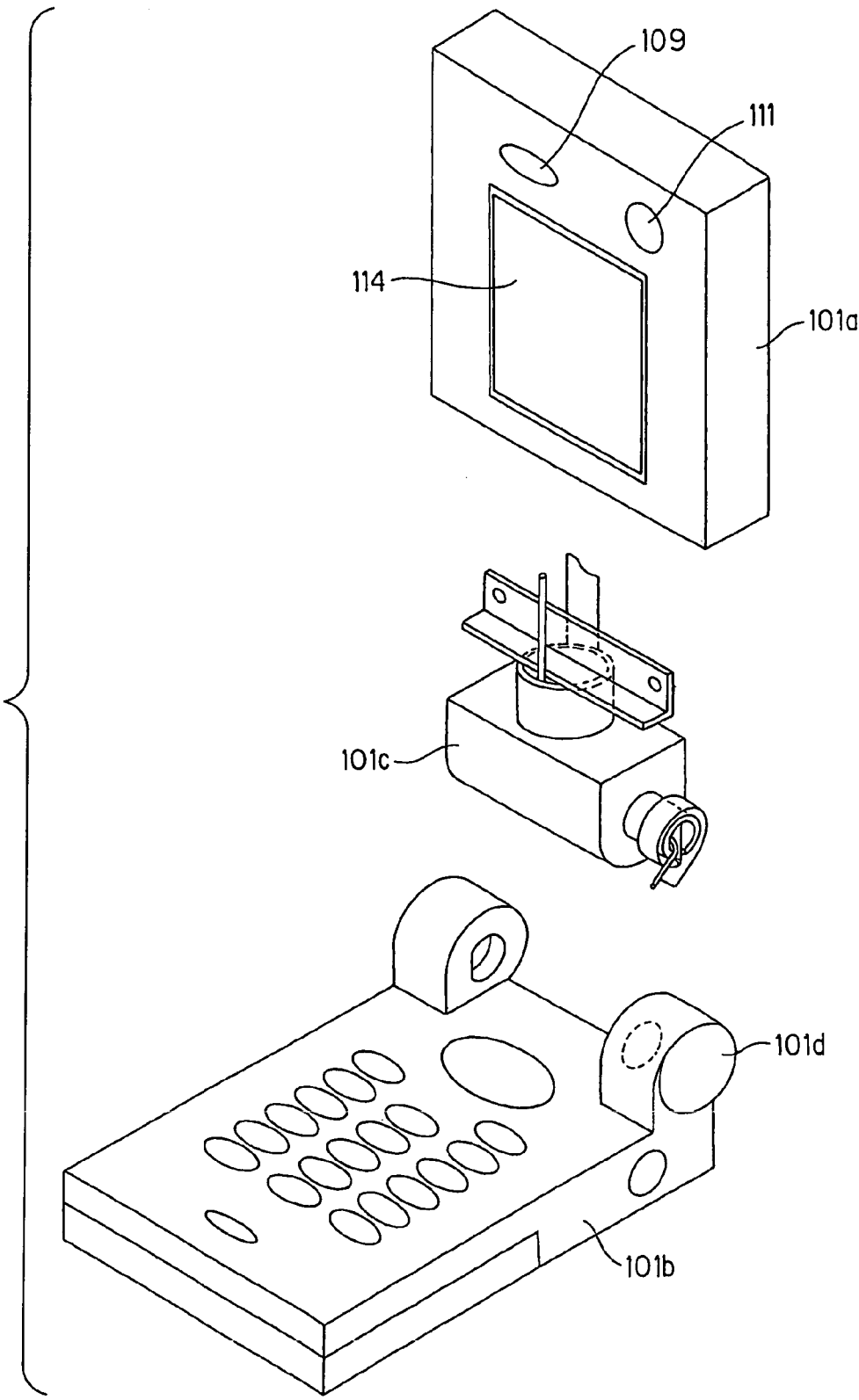
FIG. 11 is an exploded perspective view of the mobile phone according to the first embodiment of the present invention.
Figure 12:
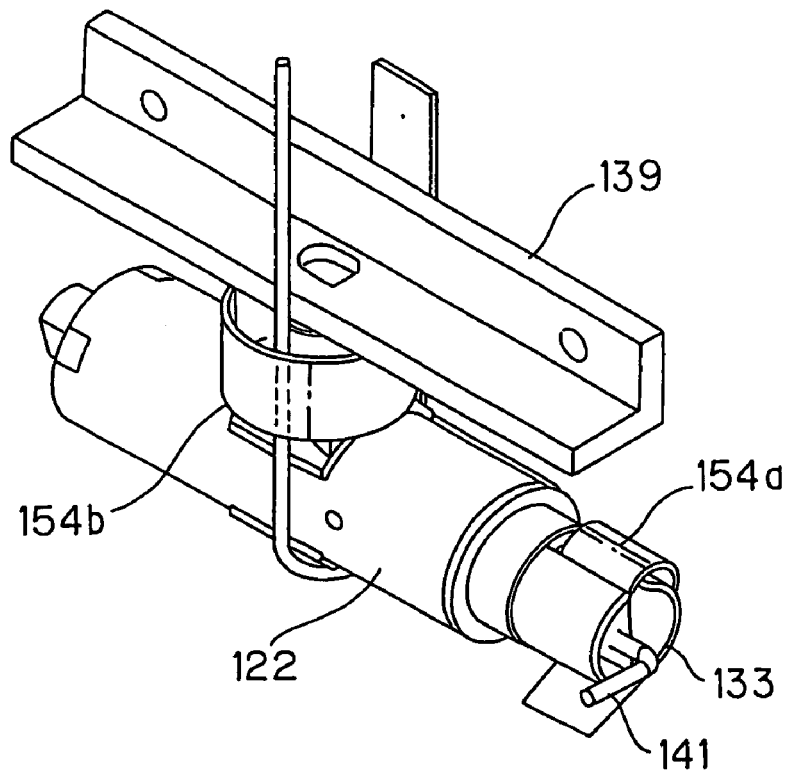
FIG. 12 is a perspective view of a hinge unit used in the mobile phone according to the first embodiment of the present invention.
Figure 13:
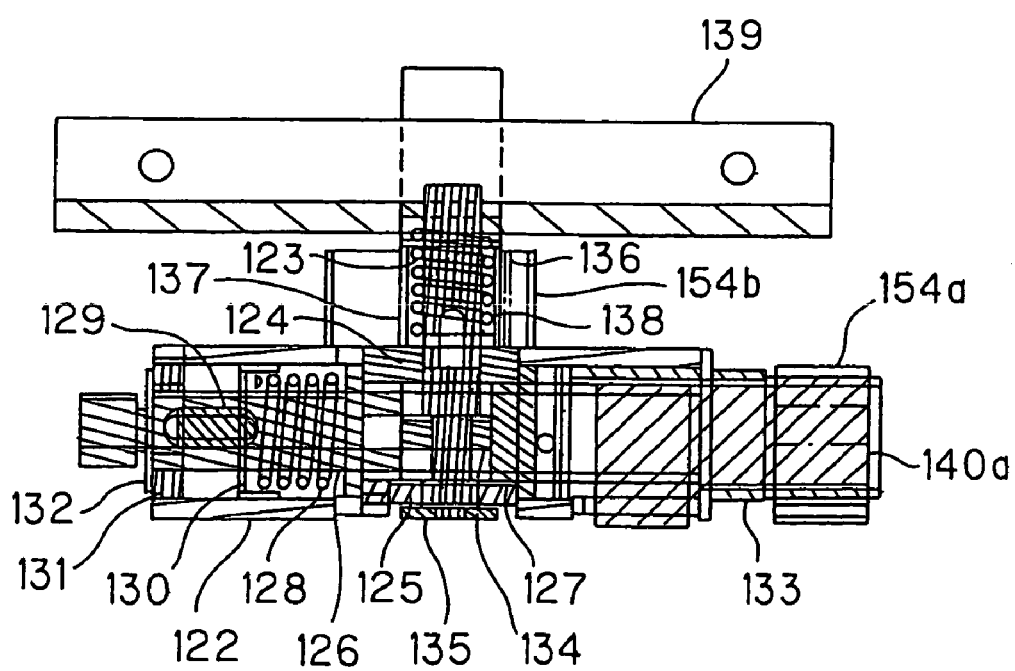
FIG. 13 is a sectional view taken along a turning shaft of the hinge unit in FIG. 12.
Figure 14:
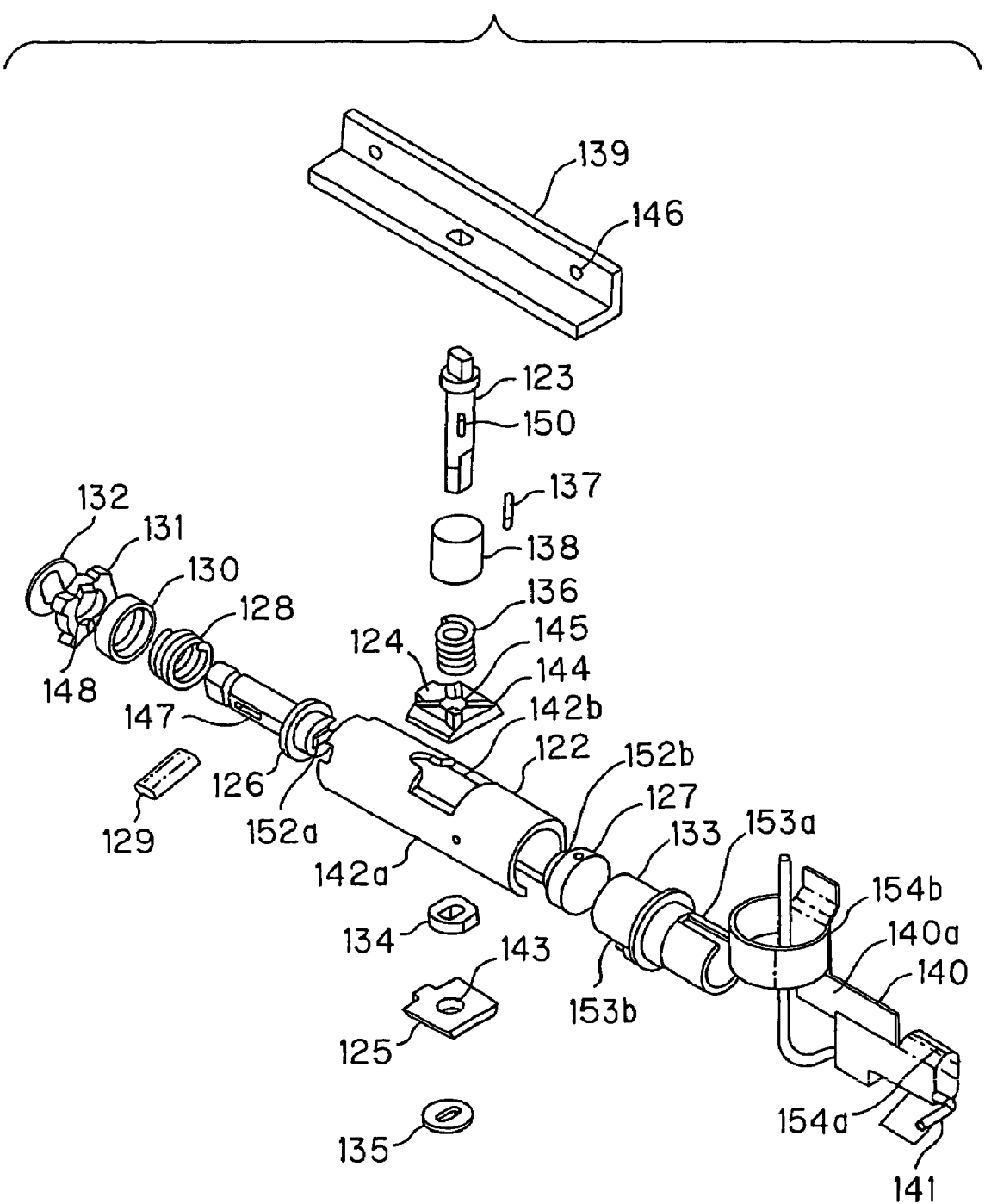
FIG. 14 is an exploded perspective view of the hinge unit in FIG. 12.
Figure 15:
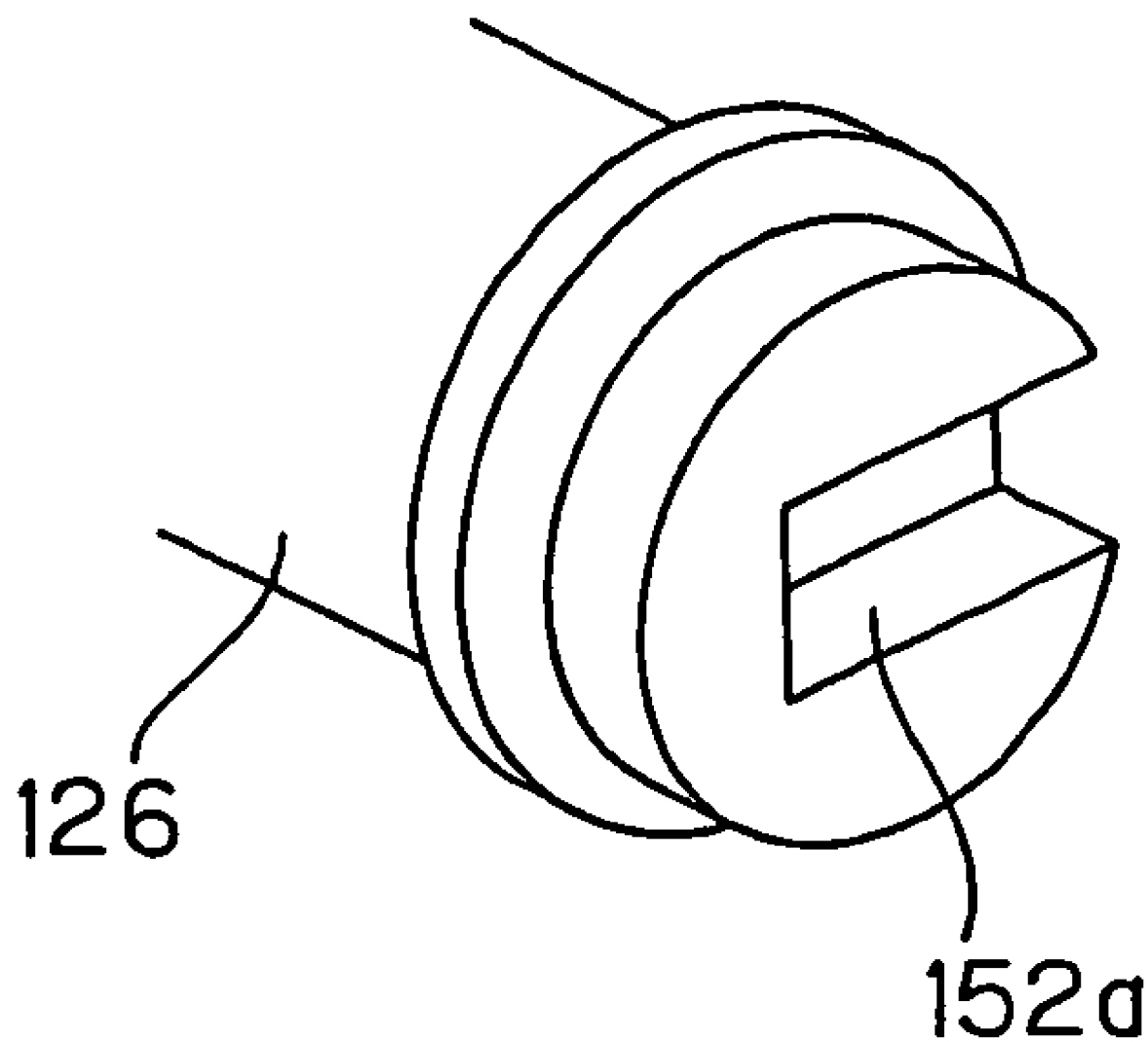
FIG. 15 is an enlarged perspective view of an end portion of a first guiding member in FIG. 14.

Next, a configuration of the hinge unit 119 will be explained in detail hereunder. FIG. 10 is a partially enlarged perspective view of a hinge portion used in a mobile phone according to a first embodiment of the present invention. FIG. 11 is an exploded perspective view of the mobile phone according to the first embodiment of the present invention. FIG. 12 is a perspective view of a hinge unit used in the mobile phone according to the first embodiment of the present invention. FIG. 13 is a sectional view taken along a turning shaft of the hinge unit in FIG. 12. FIG. 14 is an exploded perspective view of the hinge unit in FIG. 12. FIG. 15 is an enlarged perspective view of an end portion of a first guiding member in FIG. 14.

As shown in FIG. 10 to FIG. 15, the hinge unit 119 is constructed to have a first turning shaft 122, a second turning shaft 123, a first supporting plate 124, a second supporting plate 125, a first guiding member 126, a second guiding member 127, a first coil spring 128, a first sliding member 129, a first spacer 130, a first turning shaft cover 131, a first turning shaft fixing plate 132, a first turning shaft bearing 133, a cam 134, a second turning shaft fixing plate 135, a second coil spring 136, a second sliding member 137, a second spacer 138, a bracket 139, a flexible board 140, and a cable 141.

The hollow first turning shaft 122 has almost square notched portions 142a, 142b in upper and lower portions of the center portion. The first supporting plate 125 in which a first supporting hole 143 for supporting the second turning shaft 123 is formed is fitted to one notched portion 142a. The first supporting plate 124 in which a second supporting hole 143 to support V-shaped concave portions 144 and the second turning shaft 123 is formed is fitted to the other notched portion 142b. The rod-like first guiding member 126, the second guiding member 127 arranged to face to the first guiding member 126, the first coil spring 128, the first sliding member 129, the first spacer 130, and the cam 134 are housed in the inside of the first turning shaft 122, and respective members are arranged. The first turning shaft cover 131 for supporting turnably the first guiding member is fixed to one end of the first turning shaft 122, then one end of the first guiding member 126 is protruded to the outside of this cover, and then the first turning shaft fixing plate 132 is fitted to this end portion. Then, the first turning shaft bearing 133 is fitted to the other end of the first turning shaft 122.

The cam 134, the second turning shaft fixing plate 135, the second coil spring 136, the second sliding member 137, the second spacer 138, and the bracket 139 are fitted to the second turning shaft 123 and arranged. Holes 146 through which the bracket is screwed/fixed to the first housing member 101a are formed in the bracket 139.

A through hole 147 is provided to the side portion of the first guiding member 126 to pass therethrough. The first sliding member 129 that is passed through the through hole 147 can be slid in the longitudinal direction (thrust direction) of the first guiding member 126, and is energized toward the first turning shaft cover 131 side by the first coil spring 128 via the first spacer 130. A V-shaped concave portion 148 is formed on one surface of the first turning shaft cover 131, and this concave portion 148 and the first sliding member 129 engage with each other (the protruded portion of the first sliding member is fitted into the V-shaped groove) in the closed state and the first opened state.

A through hole 150 is provided to the side portion of the second turning shaft 123 to pass therethrough. The second sliding member 137 that is passed through the through hole 150 can be slid in the longitudinal direction (thrust direction) of the second turning shaft 123, and is energized toward the second supporting plate 124 side by the second coil spring 136 via the second spacer 138. Two V-shaped concave portions 144 that are formed on the second supporting plate 124 to intersect orthogonally with each other engage with the second sliding member 137 (the protruded portion of the second sliding member is fitted into the V-shaped grooves) in the closed state and the first, second, third and fourth opened states. Since the engaging surfaces of the first, second sliding members 129, 137 engaging with respective concave portions 144, 148 (top end side surfaces) are formed as a curved surface, contact points (contact portions) between the concave portions 144, 148 and the engaging surfaces include a line contact and thus they do not budge an inch (they are not rickety) at the time of engagement.

Also, one terminal of the first guiding member 126 is mounted onto a receiving portion 151 formed in the second housing member 101b. The cam 134 is fixed to the almost center portion of the second turning shaft 123. Also, the cam 134 is incorporated into the first turning shaft 122 to put between the first and second guiding members 126, 127. A groove 152a through which the cam 134 that is turned together with the second turning shaft 123 is turned/passed when the first housing member 101a is turned in the S direction from a state that the housing 101 is in the first opened state is formed on the other end of the first guiding member 126. Also, a groove 152b through which the cam 134 that is turned together with the second turning shaft 123 is turned/passed when the first housing member 101a is turned in the direction opposite to the S direction from a state that the housing 101 is in the first opened state is formed on the second guiding member 127.

The hollow first turning shaft bearing 133 has first and second slits 153a, 153b and is provided to stretch over the hinge portions 101c, 101d of the first housing member 101a and the second housing member 101b. The first slit 153a is directed to the second housing member 101b side, and the second slit 153b is directed to the first housing member 101a side.

The flexible board 140 has a wiring pattern that connects electrically the first housing member 101a and the second housing member 101b, and both ends of a crank portion 140a consisting of an L-shape corner and an inverse L-shape corner are folded gently like an almost L-shape, when viewed from the side direction. In this case, although the crank portion is formed of the L-shape corner and the inverse L-shape corner, such crank portion may be formed like a ⊐-shape, and the shape is not limited to this. One end of this flexible board 140 is wound around the first turning shaft bearing 133 in the hinge portion 101d of the second housing member 101b to form a first winding portion 154a. The other end of this flexible board 140 is extended to the second slit 153b side to pass through the first turning shaft bearing 133 from the first slit 153a and wound around the second spacer 138 to form a second winding portion 154b. Then, the other end of the second winding portion 154b side is connected to an electric circuit in the first housing member 101a. In other words, one end of the flexible board 140 goes out of the first slit 153a to form the first winding portion 154a, and the other end goes out of the second slit 153b to from the second winding portion 154b, and the crank portion 140a is installed into the first turning shaft bearing 133.

The cable 141 connects electrically the antenna 102 provided to the first housing member 101a and the transmitter/receiver portion 103 provided in the second housing member 101b. The cable 141 is passed through the first turning shaft bearing 133 from the end portion of the first turning shaft bearing 133, and is extended to the first housing member 101a side to pass through the second winding portion 154b of the flexible board 140 from the second slit 153b, and is connected to the antenna 102.

Figure 16:
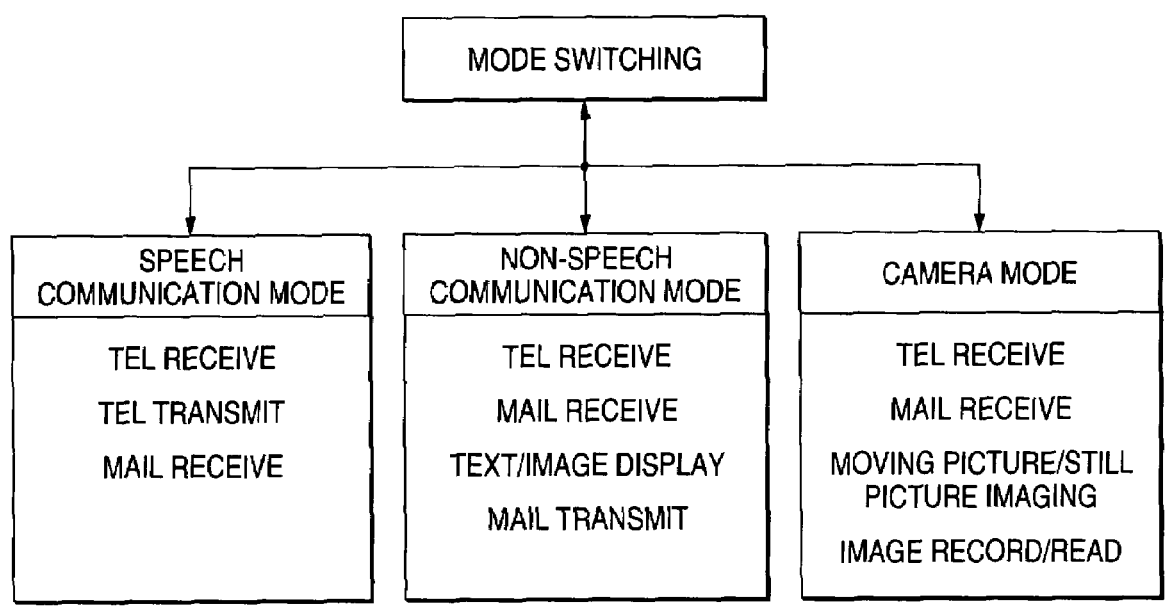
FIG. 16 is an explanatory view explaining functions of the mobile phone according to the embodiment of the present invention.
Figure 17:
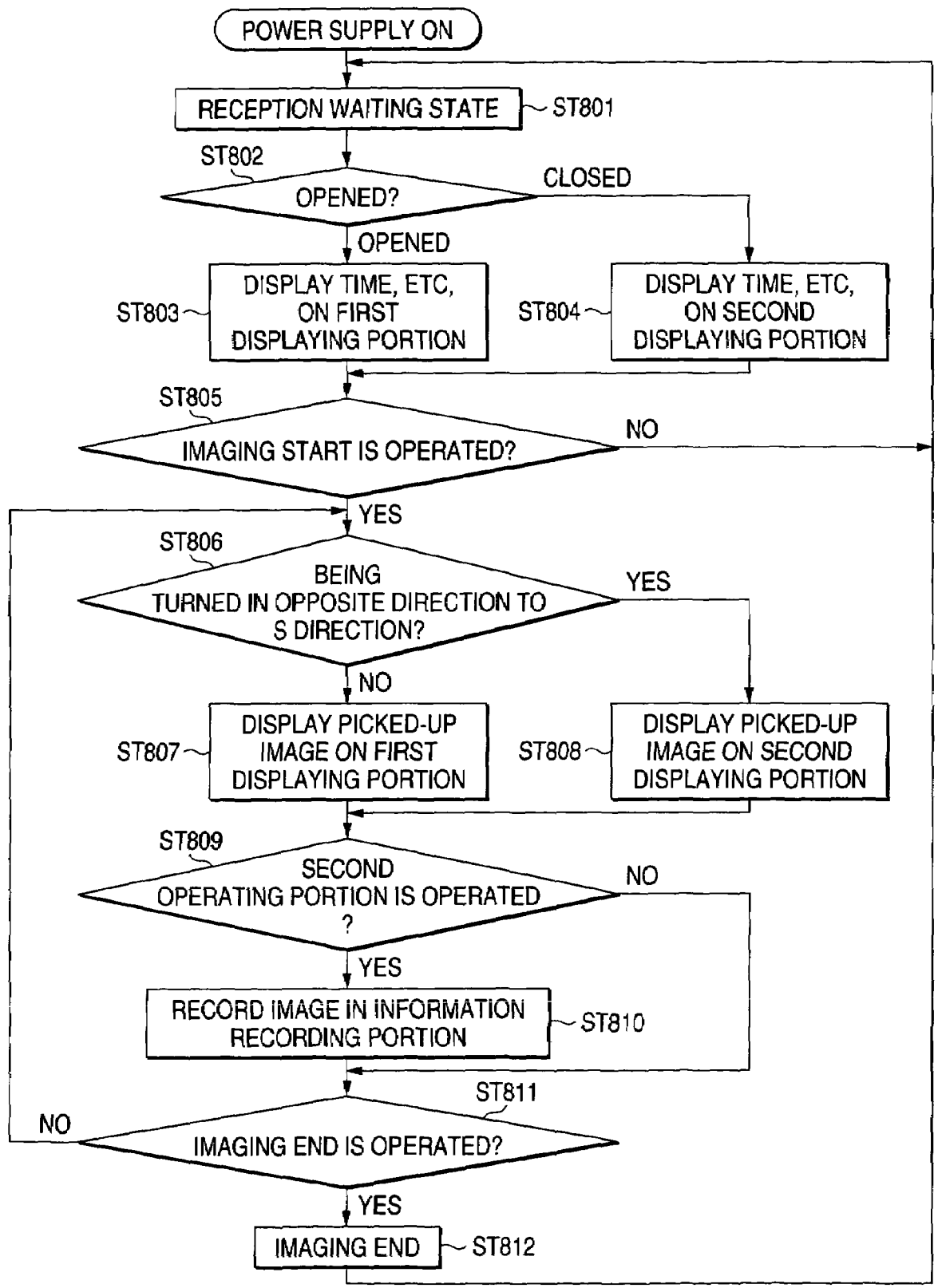
FIG. 17 is a flowchart explaining an operation of the mobile phone according to the embodiment of the present invention.

Next, an operation of the mobile phone of the embodiment of the present invention will be explained with reference to FIG. 1 to FIG. 15 as well as FIG. 16 and FIG. 17 hereunder. FIG. 16 is an explanatory view explaining functions of the mobile phone according to the embodiment of the present invention. FIG. 17 is a flowchart explaining an operation of the mobile phone according to the embodiment of the present invention.

An operation is started in a speech communication mode in the situation that a power supply of the mobile information phone is turned ON. Then, the user carries out a mode switching by operating the first operating portion 105 (executing a predetermined mode switching operation), and can executes respective functional operations in a non-speech communication mode or a camera-mode.

In the speech communication mode, functions of receiving TEL, transmitting TEL, and receiving the mail are provided. In other words, the user starts a reception waiting operation for the speech and non-speech, and transmits/receives the speech signal by executing the terminating operation or the originating operation of the speech voice, and can talk with the other party of communication. Also, mail data can be received in the reception waiting operation.

In the non-speech communication mode, functions of receiving TEL, receiving the mail, displaying the text/image, and transmitting the mail are provided. In other words, the user cause the first displaying portion 114 to display text information input from the first operating portion 105 while keeping the reception waiting state, and can transmit them to the other party of communication by using the transmitting function. Also, when received the text information or the image information, the user can display the message informing such reception on the first displaying portion 114 and the second displaying portion 115 and also can display the text information or the image information on the first displaying portion 114 and the second displaying portion 115. In this case, in order to define the transmission destination when the speech communication or the non-speech communication is executed, the transmission destination may be chosen and defined by using the phone book function.

In the camera mode, functions of receiving TEL, receiving the mail, picking up the moving picture/still picture, and recording/reading the image are provided. In other words, the user can pick up the image of the subject by a lens and a photoelectric conversion element (imaging means) in the camera portion 111 while maintaining the reception waiting state. At this time, the user can display the image information projected on the photoelectric conversion element by the lens on the first displaying portion 114 or the second displaying portion 115, and can store and read the picked-up image information into and from the information recording portion 107.

As shown in a flowchart in FIG. 17, when the power supply is turned ON, the device is brought into a reception waiting state (step ST801). Then, the controlling portion 116 determines whether or not the housing 101 is opened, based on whether or not the sensed signal from the first Hall element 112 is present (step ST802). If the housing 101 is opened, the controlling portion displays information of a mark indicating an electric field strength, a remaining capacity of the cell, a time, etc. on the first displaying portion 114 (step ST803). In contrast, if the housing 101 is closed, the controlling portion displays information of a mark indicating an electric field strength, a remaining capacity of the cell, a time, etc. on the second displaying portion 115 (step ST804).

Then, in order to start the imaging by the camera portion 111, the controlling portion 116 determines whether or not the mode is switched into the camera mode by operating the first operating portion 105 and the imaging starting operation is executed in the situation that the housing 101 is opened (step ST805). If the imaging starting operation is executed in step ST805, the controlling portion 116 determines whether or not the first housing member 101a was turned on the opposite side to the S direction, i.e., the first housing member is in the fourth opened state, based on whether or not the sensed signal from the second Hall element 113 is present (step ST806). In contrast, if the imaging starting operation is not executed in step ST805, the process goes back to step ST801.

In step ST806, if the first housing member 101a was not turned on the opposite side to the S direction and is in any one of the first, second, and third opened states, the controlling portion displays the image information picked up by the camera portion 111 on the first displaying portion 114 (step ST807). In contrast, in step ST806, if the first housing member 101a was turned on the opposite direction to the S direction and is in the fourth opened state, the controlling portion displays the image information picked up and generated by the camera portion 111 on the second displaying portion 115 (step ST808).

After step ST807 or step ST808, the controlling portion 116 determines whether or not the second operating portion 106 was operated to record the picked-up image (step ST809). If the second operating portion 106 was operated in step ST809, the controlling portion records the picked-up image in the information recording portion 107 (step ST810). If the second operating portion 106 was not operated in step ST809 and after step ST809, the controlling portion 116 determines whether or not the imaging ending operation was made by the operation of the first operating portion 105 to end the imaging (step ST811).

In step ST811, if the imaging ending operation was not made by the first operating portion 105, the process goes back to step ST806. In contrast, if the imaging ending operation was not made in step ST811, the controlling portion ends the imaging (step ST812) and the process goes back to step ST801. The first operating portion 105 has functions of causing the camera portion 111 to start the imaging when it accepts a predetermined operation in the reception waiting state, and causing the camera portion 111 to end its operation when it accepts the operation in the situation that the camera portion 111 is being operated. The second operating portion 106 has functions of recording/storing the picked-up image in the information recording portion 107 when it accepts the operation in the situation that the imaging made by the camera portion 111 is being started.

Next, a turning operation of the housing will be explained in detail hereunder.

Even if the mobile phone is in any state of the closed state of the housing 101 and the first to fourth opened states, such mobile phone enters into the reception waiting state whenever the power supply is turned ON. Also, the imaging by the camera portion 111 is available in any state of the first to fourth opened states.

When the housing 101 is opened from the closed state, the hinge unit 119 is turned on a center axis of the first turning shaft 122 while the first guiding member 126 mounted to the second housing member 101b is not turned yet. At this time, the first sliding member 129 gets out of the concave portion 148 on the first turning shaft cover 131 to break off the engagement and generates a click. When the first housing member 101a and the second housing member 101b are continued to open up to about 170 degree, the first sliding member 129 enters into the engagement with the concave portion 148 on the first turning shaft cover 131 and generates a click.

At this time, the number of turn of the first winding portion 154a of the flexible board 140 is reduced because the first turning shaft bearing 133 that is turned together with the first turning shaft 122 is turned or is reduced because a winding curvature is expanded, and also the bending stress generated in the flexible board is reduced. Since the cable 141 is arranged to coincide substantially with a center axis of the first turning shaft 122, change of the bending stress is seldom generated and only the torsional stress is generated. When the housing 101 is closed from its opened state, the operations taken to open the housing from the above closed state are carried out inversely.

Now, a relationship between the cam and the guiding member in the hinge portion will be explained with reference to the drawings hereunder. FIGS. 18(A) to (C) are a cam chart showing a relationship between the cam and the guiding member of the hinge unit according to the first embodiment of the present invention.

The cam 134 has an almost elliptic shape whose radii of curvatures at both ends are different. The first guiding member 126 is arranged on the left side of the cam 134, while the second guiding member 127 is arranged on the right side. In FIG. 18(A), the cam 134 in the upper stage shows the position when the housing 101 is closed, the cam 134 in the middle stage shows the position when the housing 101 is in the first opened state, and the cam 134 in the lower stage shows the position when the housing 101 is in the second opened state. Since the cam 134 is surrounded with the first and second guiding members 126, 127 in the state that the housing 101 is closed shown in the lower stage, the cam 134 and the first housing members 101a are forced not to turn on the second turning shaft 123. Also, since the cam 134 is put between the grooves 152a, 152b of the first and second guiding members 126, 127 in the state that the housing 101 is in the first opened state shown in the middle stage, the cam 134 and the first housing member 101a can turn on the second turning shaft 123 in the S direction or the opposite direction to the S direction.

Also, FIG. 18(B) shows the position of the cam 134 when the housing 101 is in the third opened state, and FIG. 18(C) shows the position of the cam 134 when the housing 101 is in the fourth opened state. The cam 134 takes the third opened state when it is turned from the first opened state in the S direction. Also, the cam 134 takes the fourth opened state when it is turned in the opposite direction to the S direction. The grooves 152a, 152b of the first and second guiding members 126, 127 restrict the turn of the cam even when the cam tries to continue further its turn from the third and fourth opened states. That is, the cam 134 comes into contact with the groove 152a or 152b of the first guiding member 126 or the second guiding member 127 and its turn is suppressed.

Also, when the first housing members 101a is being turned from the first opened state in any direction of the S direction and the opposite direction to the S direction, the cam 134 is guided along the grooves 152a, 152b and thus cannot be moved in the vertical direction in FIGS. 18(A) to (C), i.e., in the direction along which the first housing members 101a is opened/closed. In this case, the structure for restricting the movement of the cam in the vertical direction is realized by setting a clearance between the first guiding member 126 and the second guiding member 127 larger than the minor axis of the cam 134 but smaller than the major axis and then putting the cam 134 turnably between the grooves 152a, 152b that oppose to each other.

Also, when the housing 101 is going to be opened from the first opened state to the second opened state, the cam 134 and the first housing member 101a are brought into the state that they cannot turn on the second turning shaft 123 since the cam 134 is surrounded with the first and second guiding members 126, 127, like the closed state. In this state, the first turning shaft 122 is turned to open/close the first housing member 101a.

That is, the second turning shaft 123 cannot turn in the closed state and the second opened state. Also, the second turning shaft 123 can turn in the first opened state, but the first turning shaft 122 cannot turn if the second turning shaft 123 is turning in the first opened state.

Also, when the first housing member 101a is turned from the first opened state in the S direction, the cam 134 enters into the groove 152a of the first guiding member 126 to produce the third opened state. At this time, the second sliding member 137 gets out of the concave portion 144 on the second supporting plate 124 and generates a click, and then engages with the concave portion 144 once again in the third opened state and generates a click. When the first housing member 101a is turned from the first opened state in the opposite direction to the S direction, the cam 134 enters into the groove 152b of the second guiding member 127 to produce the fourth opened state. At this time, the second sliding member 137 gets out of the concave portion 144 on the second supporting plate 124 and generates a click, and then engages with the concave portion 144 once again in the fourth opened state and generates a click. When the first housing member 101a is turned inversely from the third or fourth opened state to the first opened state, the second sliding member 137 engages with the concave portion 144 on the second supporting plate 124 and generates a click.

Figure 19:
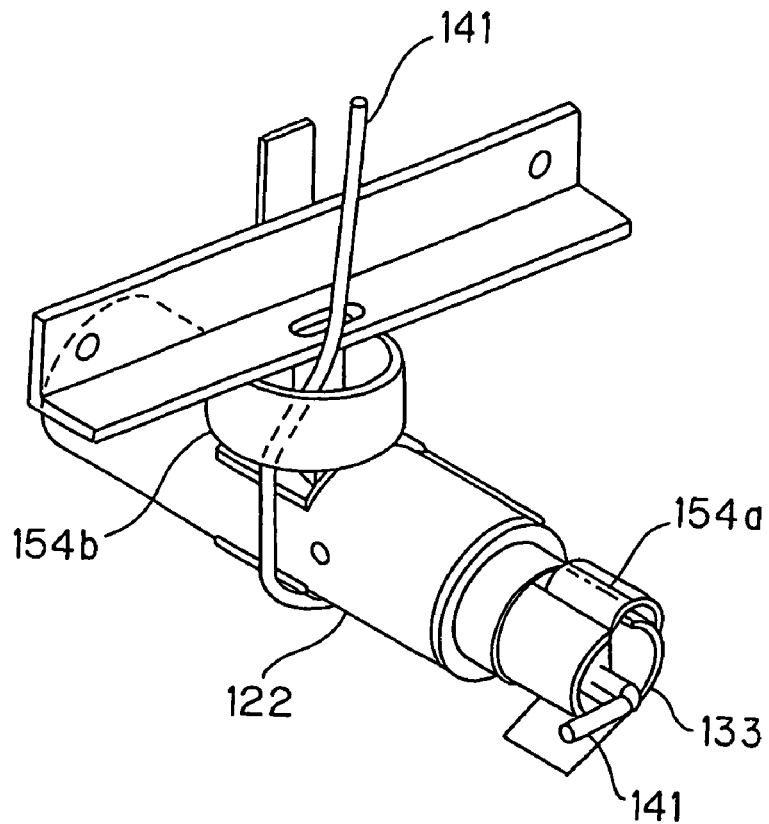
FIG. 19 is a perspective view of the hinge portion in the third opened state shown in FIG. 5.

At this time, the number of turn of the second winding portion 154b of the flexible board 140 is increased/decreased by an amount of turn of the second turning shaft. Since the flexible board 140 merely increase/decrease the number of turn, only the bending stress of the flexible board 140 is increased/decreased and no torsional stress is generated. The cable 141 is twisted by an amount of turn of the second turning shaft 123 and then screwed on the second turning shaft 123. In this case, since the second turning shaft 123 is smaller in diameter than the first turning shaft 122, a radius of turn of the screwed portion is small and thus generation of the large bending stress can be avoided. FIG. 19 is a perspective view of the hinge portion in the third opened state shown in FIG. 5, and shows a mode of the above cable 141.

In other words, since the flexible board 140 includes the first and second winding portions 154a, 154b around center axes of the first and second turning shafts 122, 123 respectively, only curvatures of the first and second winding portions 154a, 154b are changed even when the first and second turning shafts 122, 123 are turned. For this reason, tension and deflection generated in the flexible board 140 at time of turning are absorbed by the winding portions 154a, 154b and therefore only the bending stress is changed and generation of the torsional stress can be avoided. As a result, disconnection and breakage of the wirings in the flexible board 140 can be prevented.

In the present embodiment, explanation is made of the case where the second turning shaft is formed of a solid shaft. The stress generated in the cable upon turning the second turning shaft can be further reduced if the second turning shaft is formed of a hollow shaft like the first turning shaft. More particularly, a coupling space can be formed in the inside of the first turning shaft and the inside of the second turning shaft if an opening is provided in a cylindrical surface of the hollow second turning shaft and then this opening is arranged in the first turning shaft. The cable is arranged in the vicinity of center axes of the first and second turning shafts when the cable is passed through this coupling space. Therefore, since no bending stress is applied to the cable and only the torsional stress is generated even when the first and second turning shafts are turned, the design can be applied to take account of the torsional stress only.

Also, in the case where the cable is wound around the first turning shaft bearing, the disconnection caused by opening/closing the housing can be avoided but a length of the cable is prolonged when the structure for preventing generation of the torsional stress in the cable to generate only the bending stress is employed. Thus, a loss is increased and as a result an antenna gain is lowered, etc., such structure is not suited for the radio device having the antenna. Therefore, like the present embodiment, in the case where the structure in which the winding portions are formed of the flexible board and then the cable is passed through the winding portions is employed, the coaxial cable with small loss, or the like can be used as the connecting parts to connect the antenna and the radio circuit portion, and also generation of tension or loose of the cable can be prevented. As a result, because there is no need to keep an necessary extra length, the antenna gain can be improved by shortening the length of the cable, etc., so that such structure is suited for the opening/closing mobile terminal device. In this case, the number of turn of the winding portion is set arbitrarily. For example, the number of turn, which does not form the winding portion in the second opened state but forms the winding portion when the housing is closed, may be set.

Here, the example in using the mobile phone of the present embodiment will be explained hereunder. In the second opened state, the user can speak by putting the receiver portion 109 close to the ear, or can execute the video phone or the hands-free talking. Also, in the third opened state, the image of the user himself or herself is picked up and displayed on the first displaying portion 114 when the user grasps the device to direct the second operating portion 106 to the user side. Thus, the user can check the picked-up image by the first displaying portion 114.

Also, in the fourth opened state, the picked-up image is displayed on the second displaying portion 115 that is directed to the user when the user grasps the device to direct the second operating portion 106 to the user side. In this case, the user can pick up the image while checking the scenery or the portrait in the foreground of the user by the second displaying portion 115. At this time, because the picked-up image is not displayed on the first displaying portion 114, the subject side cannot see or looks into the picked-up image but the user can check the picked-up condition by the image displayed on the second displaying portion 115. Here, in order to make it possible for the subject itself to check the picked-up image, for example, the setting of the device may be changed by operating the first operating portion to display the picked-up image on both the first and second displaying portions in the fourth opened state.

Next, a second embodiment of a mobile phone according to the present invention will be explained hereunder. This second embodiment is different from the above first embodiment in the turning direction and the turning angle of the second turning shaft in the hinge portion.

Figure 20:
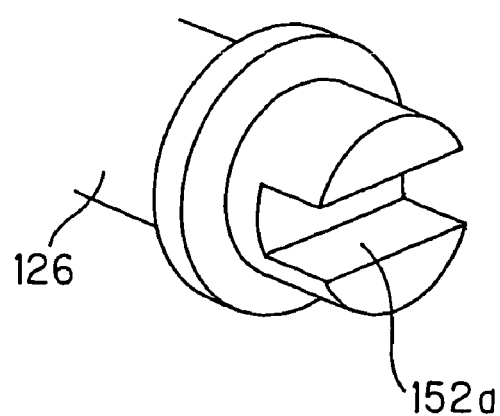
FIG. 20 is an enlarged perspective view of an end portion of a first guiding member in a hinge unit according to a second embodiment of the present invention.
Figure 21:
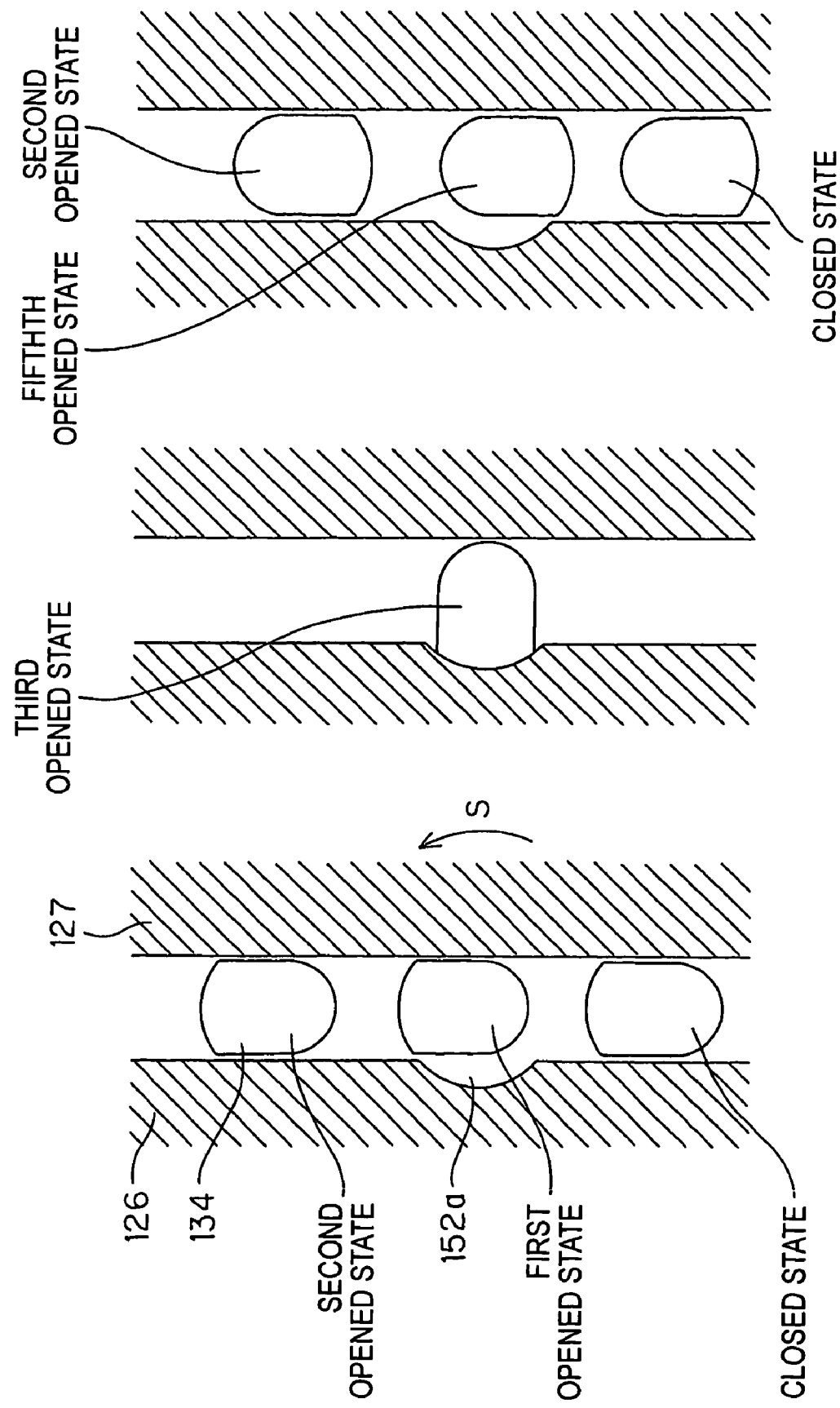
FIGS. 21(A) to (C) are a cam chart showing a relationship between a cam and a guiding member of the hinge unit according to the second embodiment of the present invention.

FIG. 20 is an enlarged perspective view of an end portion of a first guiding member in a hinge unit according to a second embodiment of the present invention. FIGS. 21(A) to (C) are a cam chart showing a relationship between a cam and a guiding member of the hinge unit according to the second embodiment of the present invention. The second turning shaft in the hinge unit of the second embodiment can be turned from the second opened state only in the S direction by 180 degree. In this second embodiment, the groove 152b is not provided to the second guiding member 127 unlike the first embodiment, and the groove 152a is formed on the end portion of the first guiding member 126 to pass therethrough. Shapes and configurations of other members are similar to those in the first embodiment, and their detailed explanation will be omitted herein.

Next, a turning operation of the housing in the second embodiment will be explained hereunder.

In FIG. 21(A), the lower stage shows the position of the cam 134 when the housing is closed, the middle stage shows the position of the cam 134 when the housing is in the first opened state, and the upper stage shows the position of the cam 134 when the housing is in the second opened state. Since the first guiding member 126 is arranged on the left side of the cam 134 the second guiding member 127 is arranged on the right side in the closed state and the second opened state, the cam 134 and the first housing member 101a cannot turn. Also, since the groove 152a of the first guiding member 126 is positioned on the left side of the cam 134 in the first opened state, the cam 134 and the first housing member 101a can turn in the S direction by 180 degree. Where a state that the first housing member 101a is turned from the first opened state by 180 degree is called a fifth opened state.

FIG. 21(B) shows the position of the cam 134 when the housing is in the third opened state. Also, in FIG. 21(C), the middle stage shows the position of the cam 134 when the housing is in the fifth opened state, the upper stage shows the position of the cam 134 when the housing is turned from the fifth opened state to the second opened state, and the lower stage shows the position of the cam 134 when the housing is turned from the fifth opened state to the closed state. Since the cam 134 is guided by the groove 152a when the cam 134 is turned from the first opened state by 180 degree or less (containing the third opened state), the mode of such cam 134 cannot be changed into the closed state or the second opened state. In contrast, when the cam 134 is in the fifth opened state after such cam 134 is turned from the first opened state by 180 degree, the mode of such cam 134 can be changed into the closed state or the second opened state.

In other words, in the second embodiment, the housing can be closed in such a manner that the second displaying portion 115 is hidden on the inner side while the first displaying portion 114 is exposed to the outer side.

According to the configuration of the second embodiment, the user can close the housing to either expose or conceal the first displaying portion 114. Therefore, the hinge that permits the first housing member to turn inside out and permits the first housing member to close while reversing the first housing member can be implemented with a simple configuration. The second embodiment is suited for the case where the user wants to look at immediately various information such as the received image, mail, etc. not to open the housing, and others.

According to the configuration of the above present embodiment, since a turning angle of the second turning shaft can be restricted by the first, second guiding members provided in the vicinity of the turning center of the first turning shaft, the miniaturization of the hinge portion can be achieved. Also, since the first turning shaft is prevented from being turned when the second turning shaft is being turned in the first opened state (when the cam 134 is guided by the groove 152a), the configuration that is capable of avoiding the event that the edge portion of the first housing member on the hinge side comes into contact with the main surface of the second housing member and capable of not providing the traces on the main surface of the second housing member by the first housing member even when the housing is operated in error can be realized with a simple configuration.

In addition, since the click is generated by a simple configuration upon turning the first, second turning shafts, the user can be easily informed of the start and the end of turning and the operability can be improved. Also, since generation of the torsional stress can be avoided and only the bending stress is generated in the flexible board, the stress generation condition becomes simple. In the case where the design is applied to take account of the life, only the bending stress should be considered and thus the design is facilitated in the present embodiment in which only the bending stress is generated in comparison with the case where various stresses are generated by the opening/closing the housing. Also, when the image is picked up by the camera portion of the device using this hinge portion, the picked-up image can be displayed on the first or second displaying portion according to the application situation and also the picked-up image can be prevented from being looked into by the third person.

The present invention is explained in detail with reference to particular embodiments. It is apparent for the person skilled in the art that various variations and modifications can be applied without departing from a spirit and a scope of the present invention.

This application is filed based on Japanese Patent Application (Patent Application No. 2002-76573) filed on Mar. 19, 2002, and the contents are incorporated as the reference herein.

INDUSTRIAL APPLICABILITY

As described above, according to the present invention, a radius of turn of the turning shaft in the hinge portion can be reduced and the miniaturization can be achieved. Also, the configuration in which only the bending stress is generated in the flexible printed board provided in the hinge portion not to generate the torsional stress can be realized and the reduction in size can be attained.

This invention claimed is:

1. A hinge comprising:
a first rotating member having a first longitudinal rotating axis around which it rotates;
a second rotating member intersecting with the first rotating member and having a second longitudinal rotating axis around which it rotates; and
a rotating restricting member for restricting a rotating angle, a rotating direction, or a rotating position of the second rotating member,
wherein the rotating restricting member is arranged in vicinity of a center axis of a rotating shaft of the first rotating member;
wherein the second rotating member rotates around the first longitudinal rotating axis as the first rotating member rotates; and
wherein the first longitudinal rotating axis intersects perpendicularly with the second longitudinal rotating axis.

2. The hinge according to claim 1,
wherein the rotating restricting member includes a cam member provided to rotate together with the second rotating member, and a guiding member provided adjacent to the cam member, and
wherein the guiding member includes a contact portion that comes into contact with the cam member when the second rotating member is rotated in a state that the first rotating member is in a first predetermined position, and a contact avoiding portion that avoids a contact with the cam member when the second rotating member is rotated in a state that the first rotating member is in a second predetermined position.

3. The hinge according to claim 2,
wherein the contact avoiding portion has an opposing surface that opposes to the cam member in a direction that intersects orthogonally with a rotating direction of the cam member in a state that the cam member is passed through the contact avoiding portion by rotating the second rotating member when the first rotating member is in the second predetermined position.

4. The hinge according to claim 1, further comprising:
a click generating member for generating a click feeling when the first rotating member is rotated toward one end side of the first rotating member.

5. An opening/closing mobile terminal device having the hinge according to claim 1.

* * * * *